United States Patent [19]

Trinchieri

[11] 4,096,561
[45] Jun. 20, 1978

[54] APPARATUS FOR THE MULTIPLE DETECTION OF INTERFERENCES

[75] Inventor: Mario G. Trinchieri, Weston, Mass.

[73] Assignee: Honeywell Information Systems Inc., Waltham, Mass.

[21] Appl. No.: 729,536

[22] Filed: Oct. 4, 1976

[51] Int. Cl.$^2$ ............................................. G06F 15/16
[52] U.S. Cl. .................................................. 364/200
[58] Field of Search ................. 364/300, 200 MS File

[56] References Cited

U.S. PATENT DOCUMENTS

| 3,573,736 | 4/1971 | Schlaeppi ............................ 364/200 |
| 3,760,365 | 9/1973 | Kurtzberg et al. .................. 364/200 |

OTHER PUBLICATIONS

Devereaux, J. A., "An Application-Oriented Multiprocessing System, III., Control Program Features," *IBM Systems Journal*, vol. 6, No. 2, 1967, pp. 95-102.

*Primary Examiner*—Raulfe B. Zache
*Attorney, Agent, or Firm*—Nicholas Prasinos; Ronald T. Reiling

[57] ABSTRACT

A general mechanism and a family of hardware/firmware instructions are disclosed, which allow sharing files and resources without interference one from the other in a multiprogramming, multiprocessing environment. The basic inventive concept of interference is developed and several embodiments of the invention are disclosed. Protective mechanisms determine when sharing of files or resources is safe, and provide alternate courses of action to be taken by the computer system when it is determined that sharing would provide wrong results.

17 Claims, 35 Drawing Figures

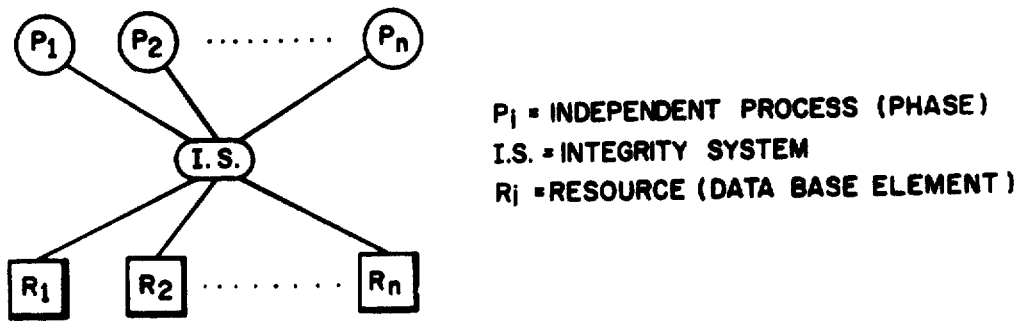
$P_i$ = INDEPENDENT PROCESS (PHASE)
I.S. = INTEGRITY SYSTEM
$R_j$ = RESOURCE (DATA BASE ELEMENT)
FIG. 1
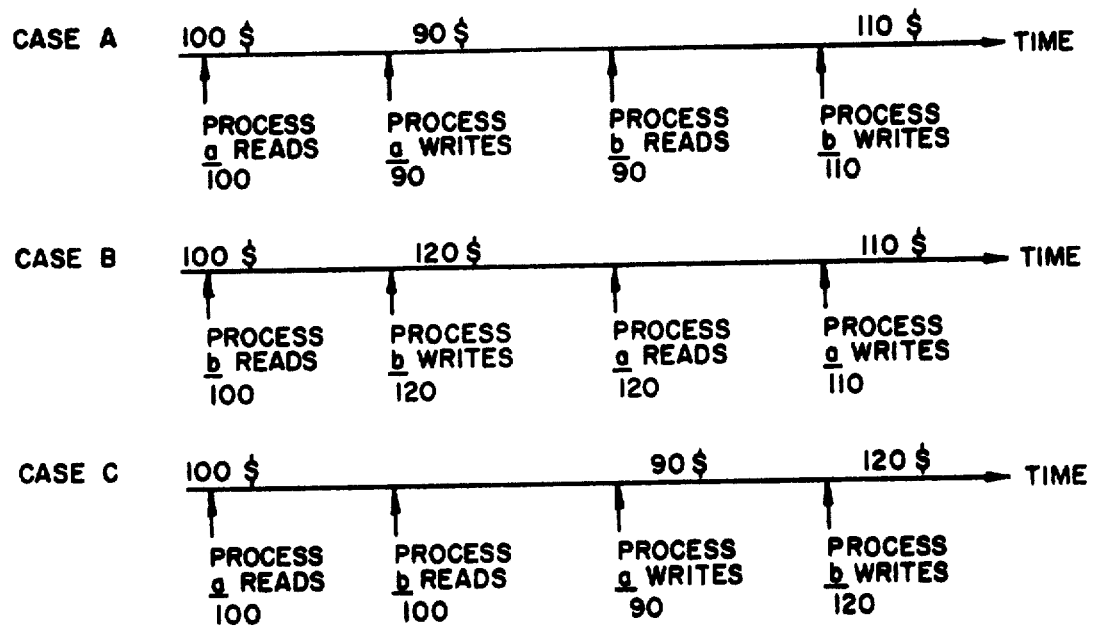
FIG. 2
 
FIG. 2a          FIG. 2d
FIG. 2b
FIG. 2c

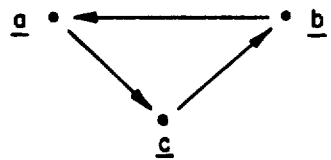
FIG. 5c
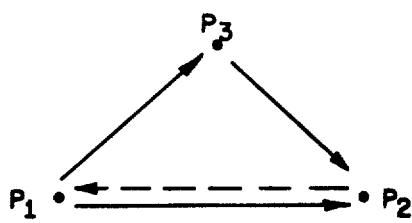
FIG. 5d
PREDECESSORS
|  | $P_1$ | $P_2$ | $P_3$ | $P_4$ |
|---|---|---|---|---|
| $P_1$ | 0 | 0 | 0 | 0 |
| $P_2$ | 1 | 0 | 0 | 0 |
| $P_3$ | 1 | 3 | 0 | 1 |
| $P_4$ | 1 | 1 | 0 | 0 |
FOLLOWERS
FIG. 6a
MATRIX OF RELATIONS
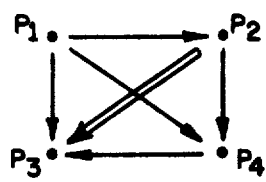
FIG. 6b
EQUIVALENT GRAPH UTILIZATION TABLES
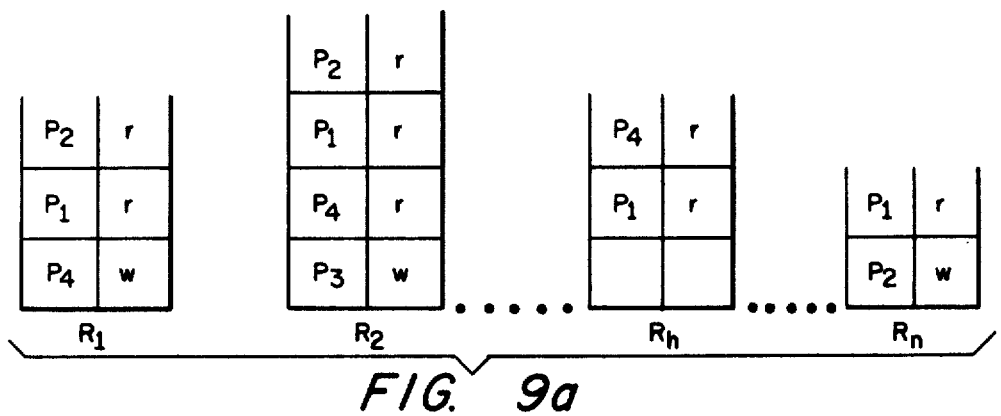
FIG. 9a
MATRIX OF RELATIONS
PREDECESSORS
|  | $P_1$ | $P_2$ | $P_3$ | $P_4$ |
|---|---|---|---|---|
| $P_1$ | 0 | 0 | 0 | 0 |
| $P_2$ | 1 | 0 | 0 | 0 |
| $P_3$ | 1 | 3 | 0 | 1 |
| $P_4$ | 1 | 1 | 0 | 0 |
FOLLOWERS
FIG. 9b
AFFECTED RESOURCES LISTS
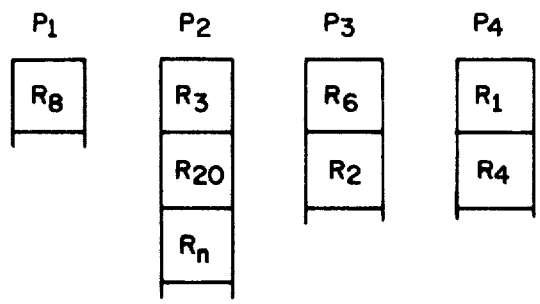
FIG. 9c

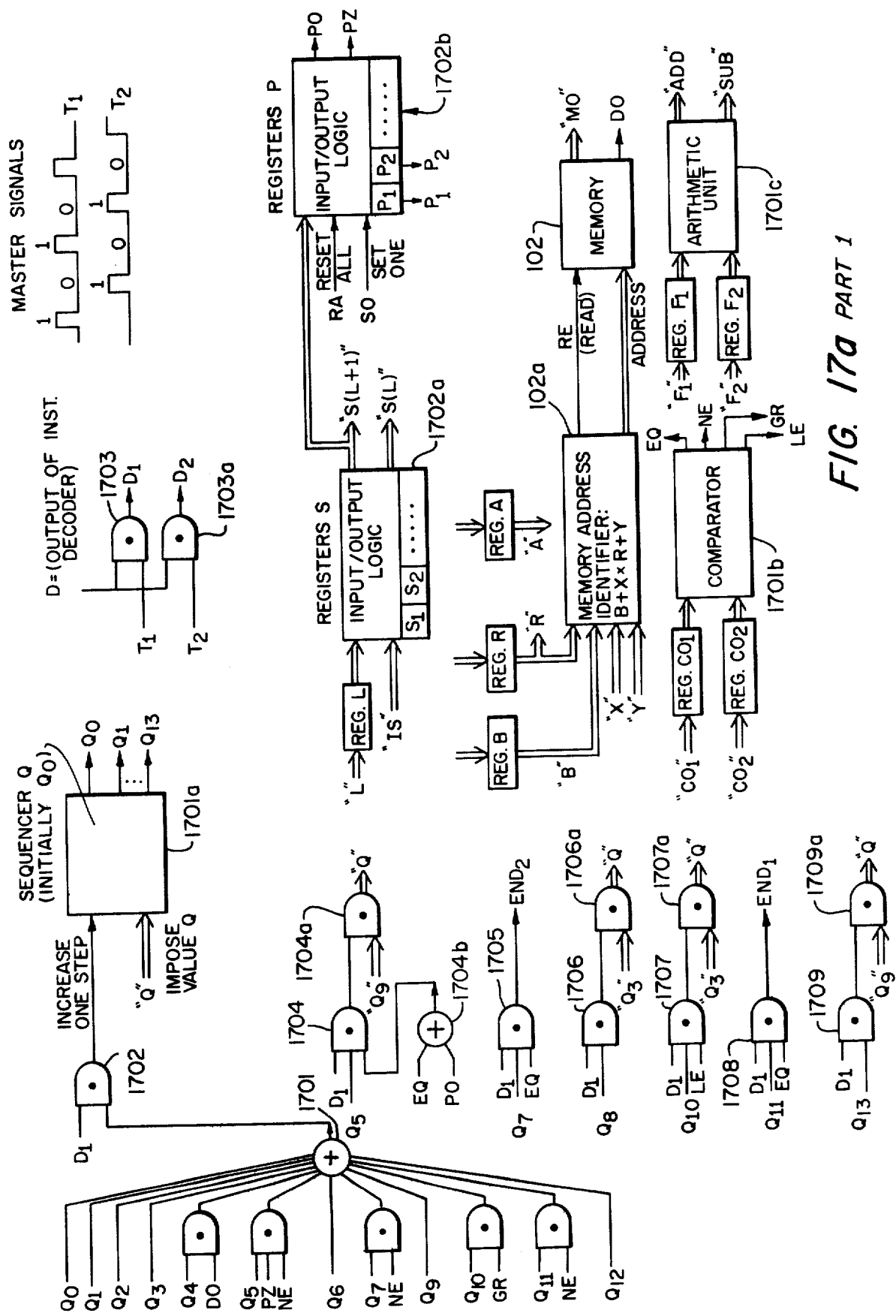
FIG. 17a PART 1

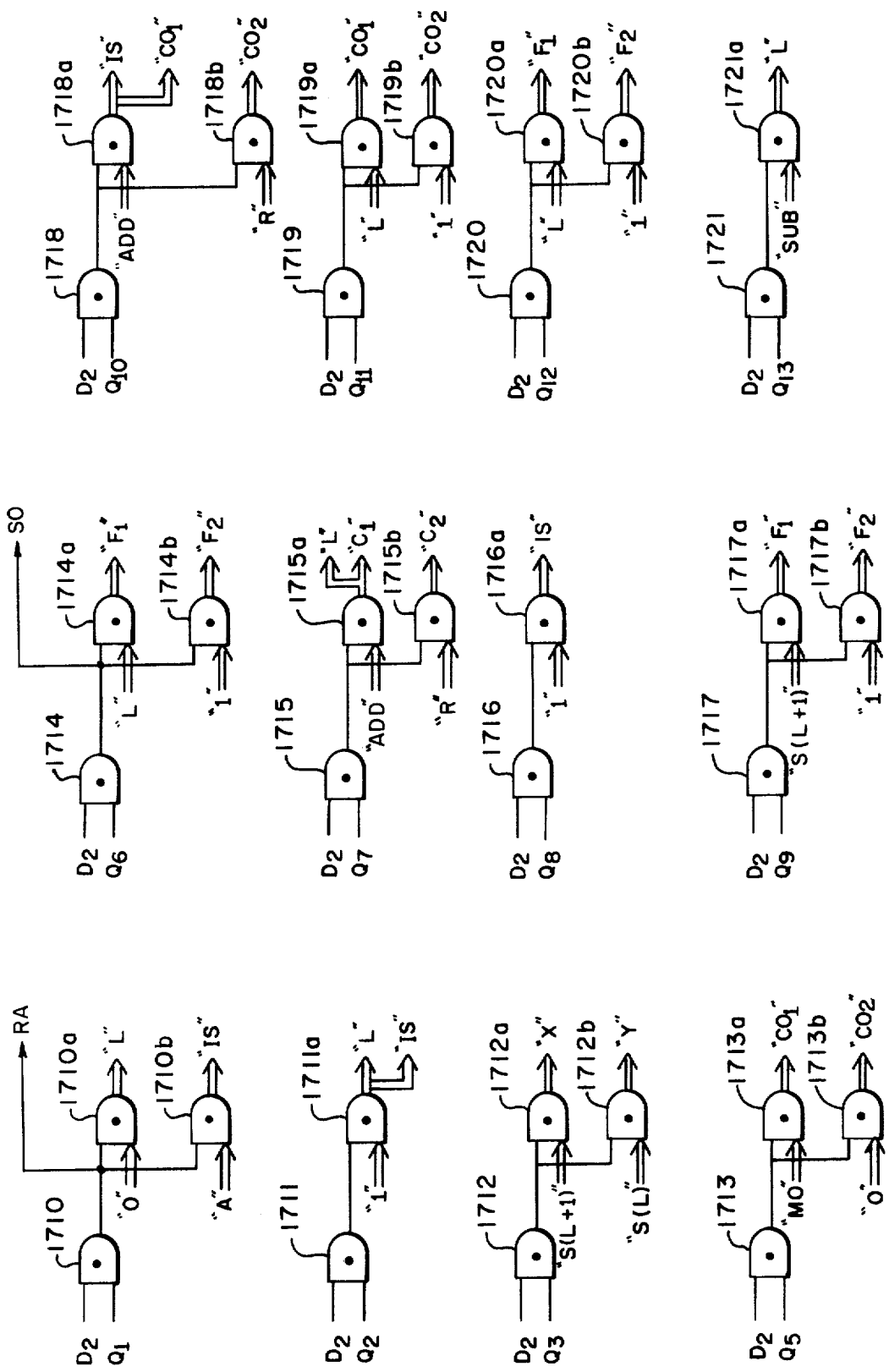
FIG. 17a PART 2

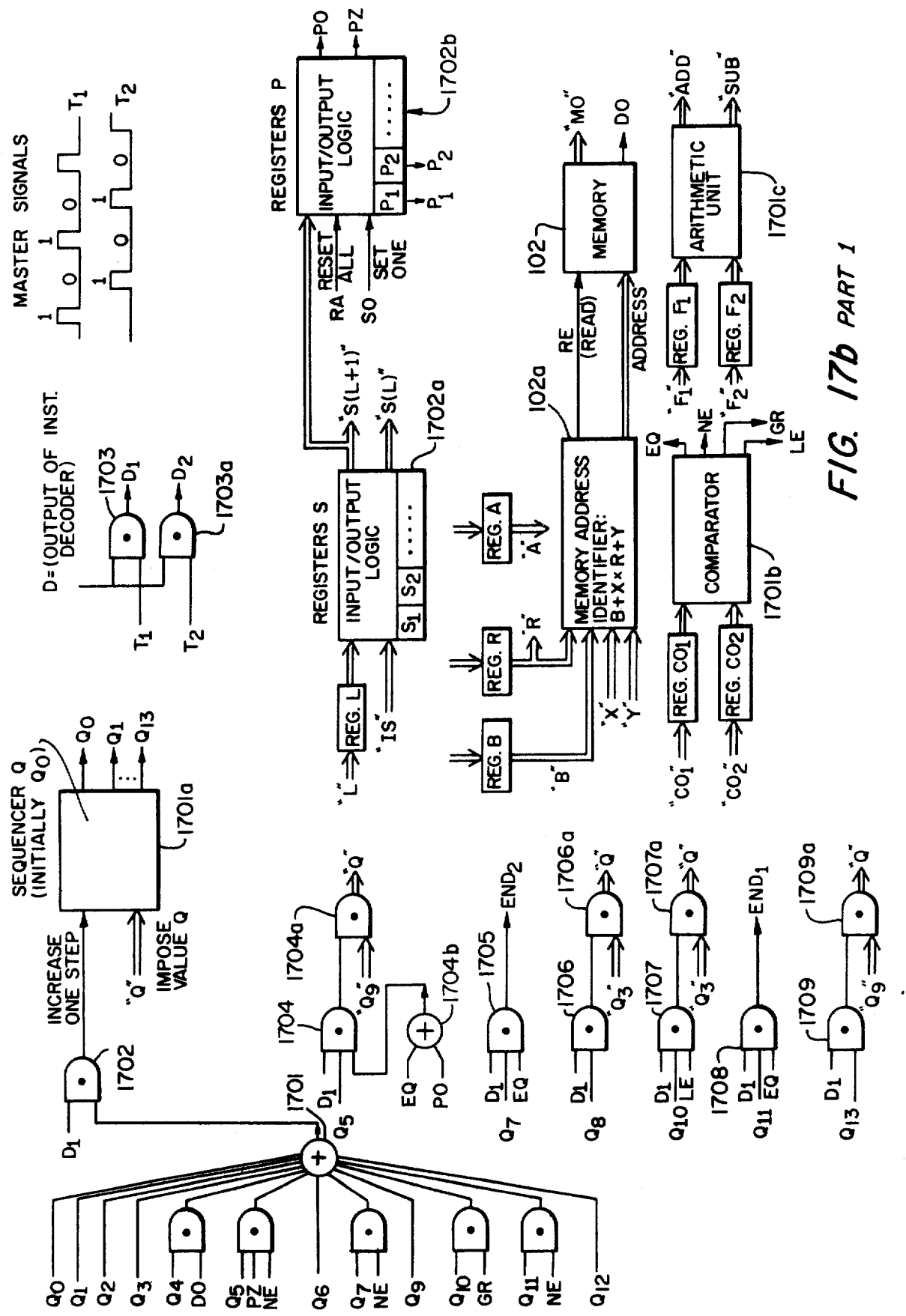
FIG. 17b PART 1

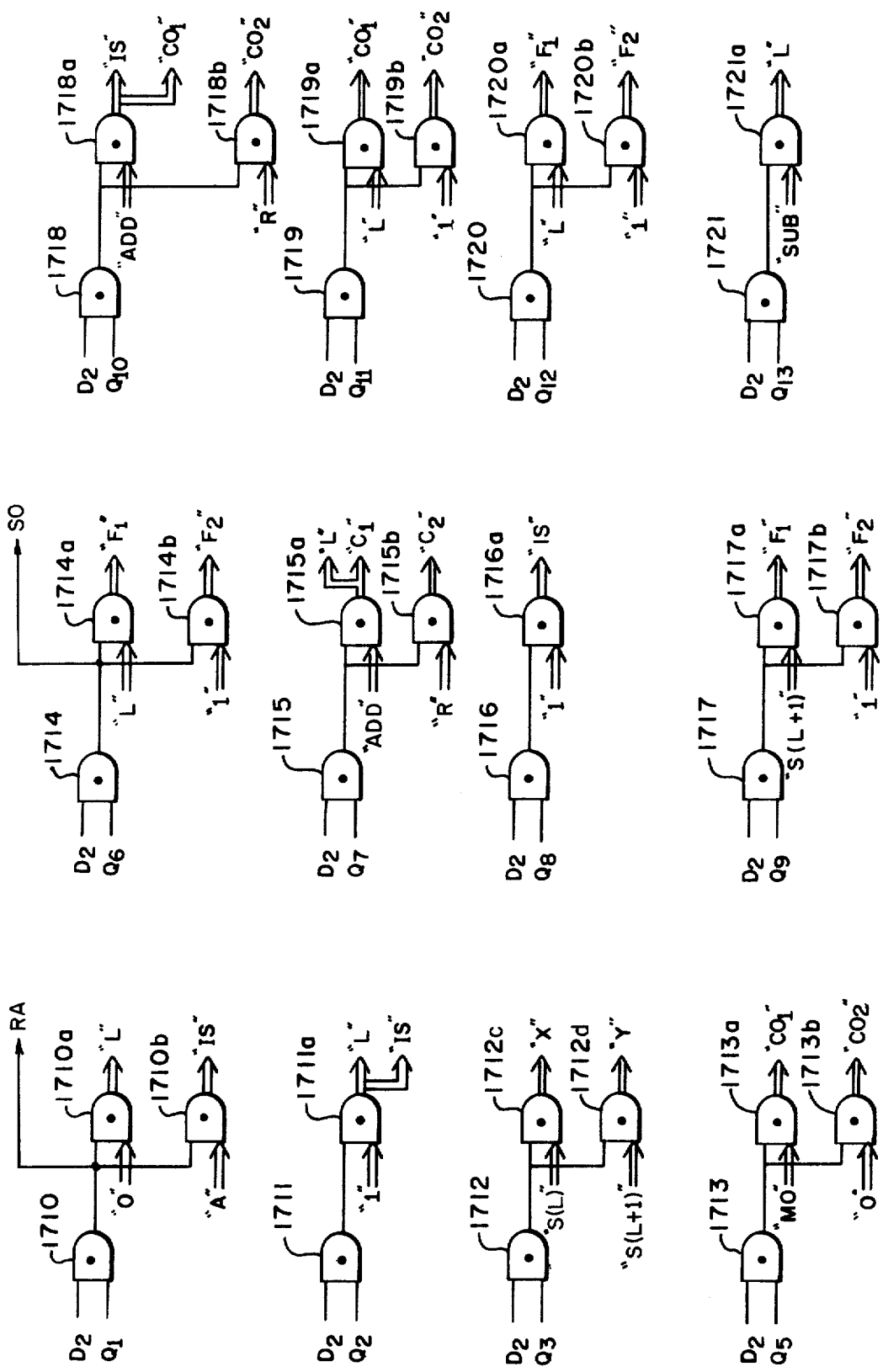
FIG. 17b PART 2

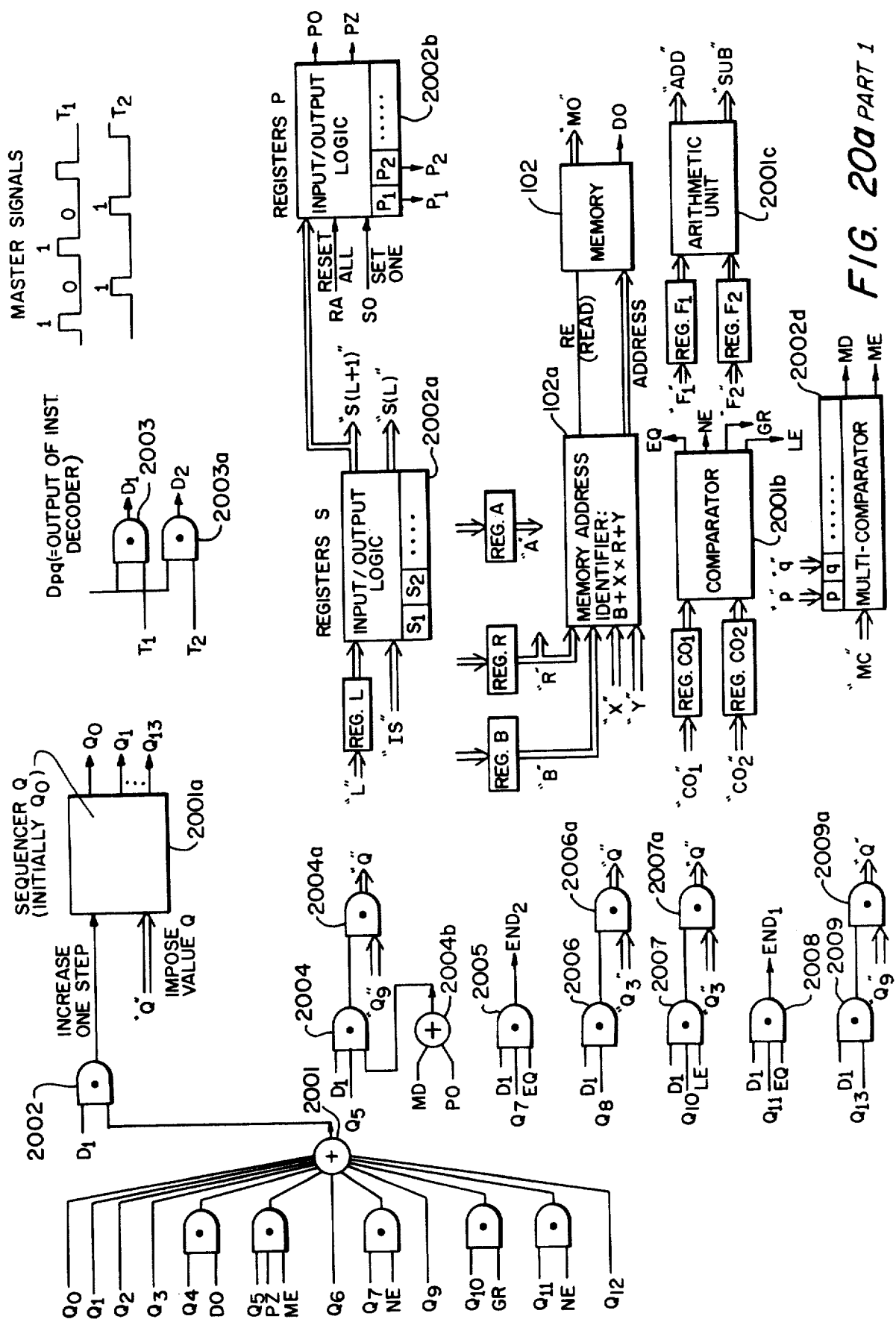
FIG. 20a PART 1

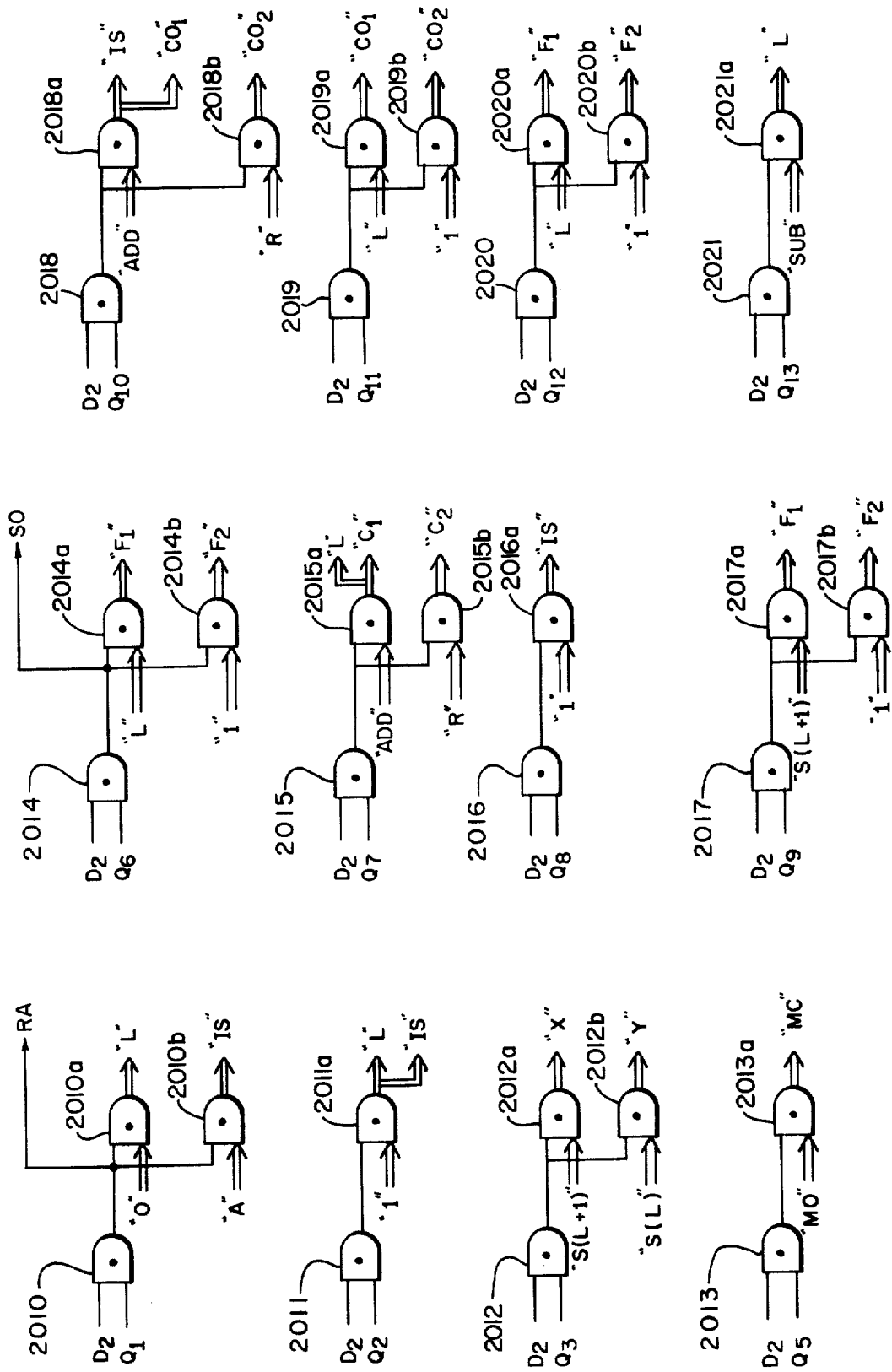
FIG. 20a PART 2

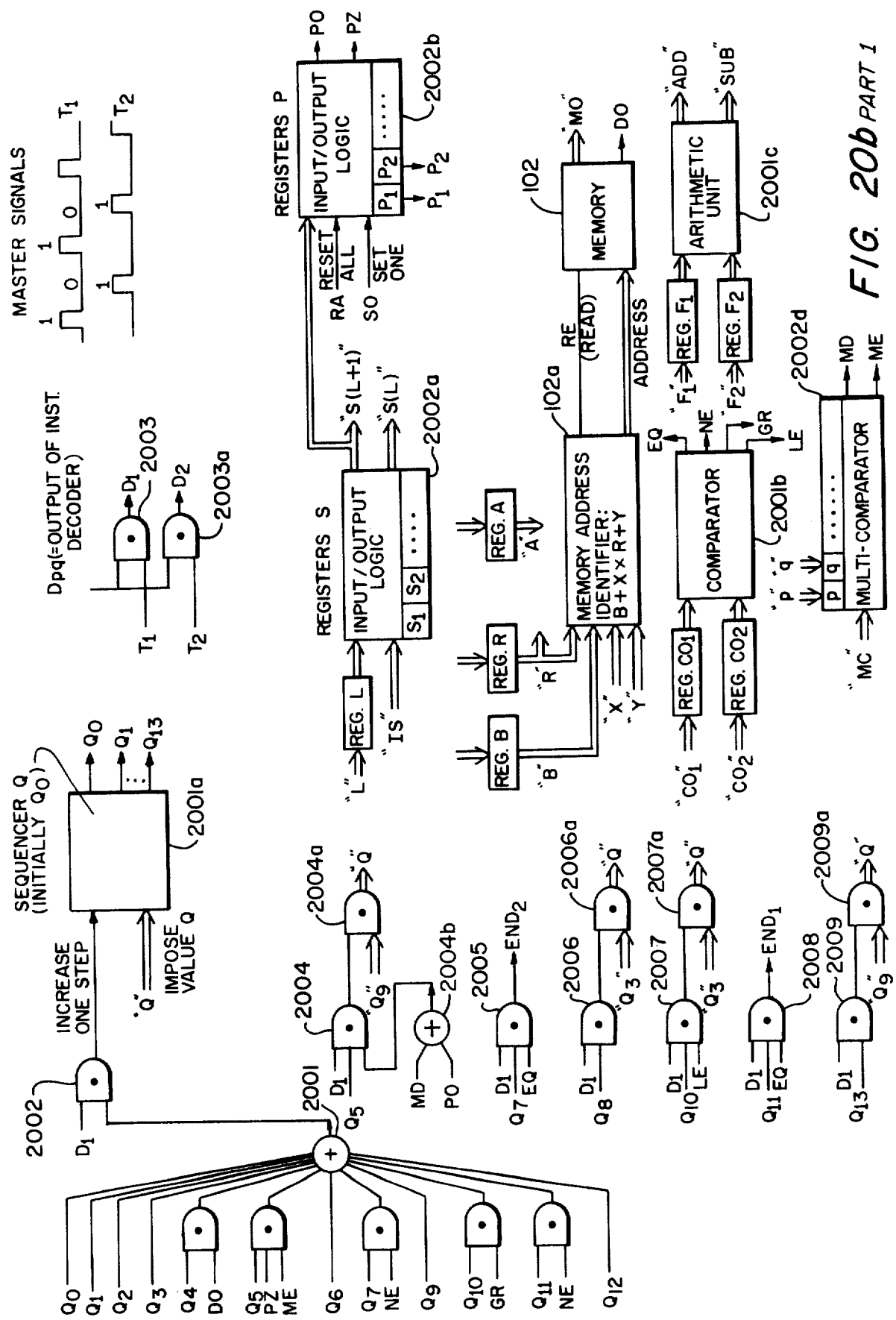

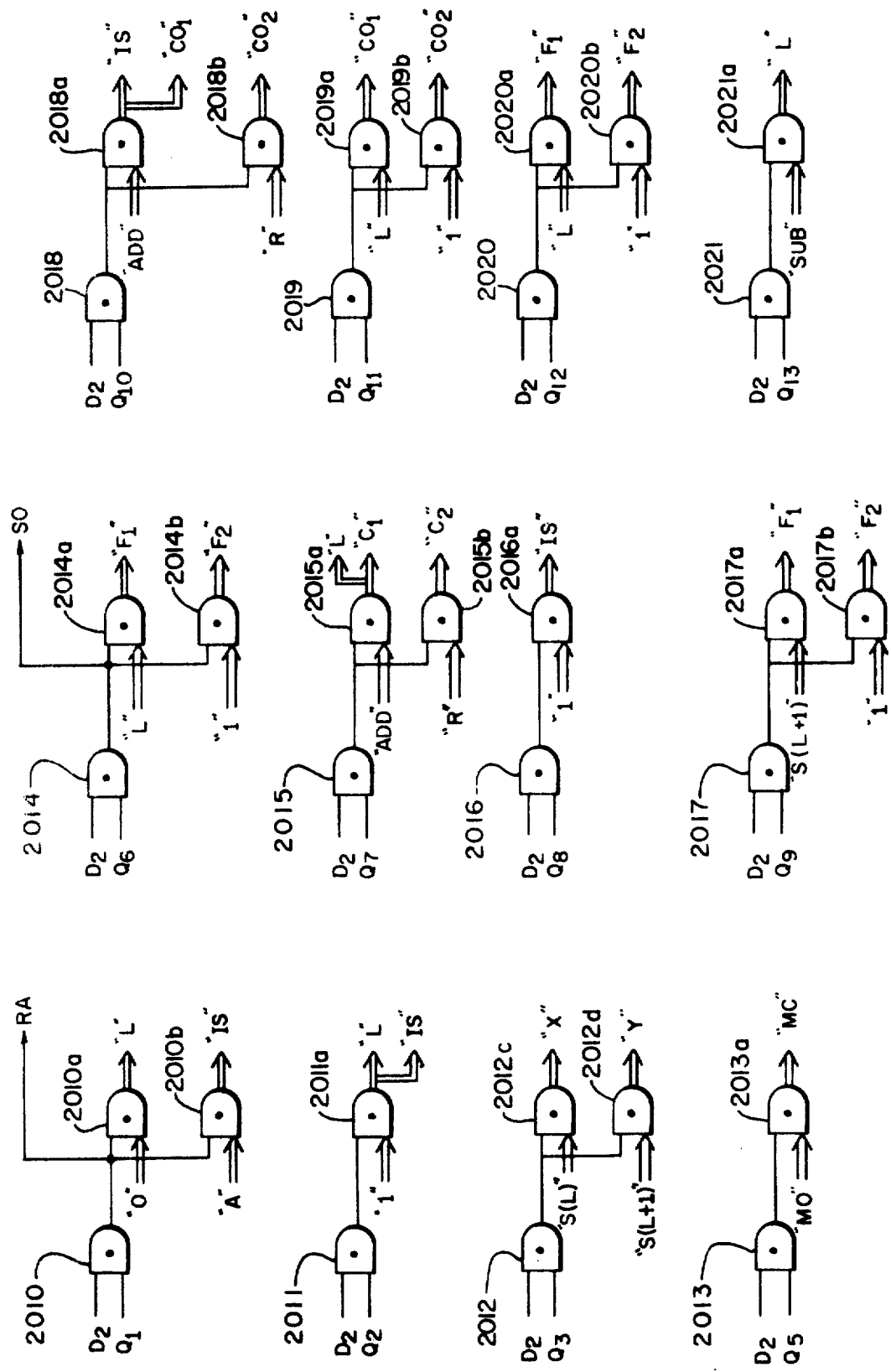
FIG. 20b PART 2

APPARATUS FOR THE MULTIPLE DETECTION OF INTERFERENCES

RELATED APPLICATIONS

The following applications are incorporated by reference to the instant application.

1. "System for Interference Protection" invented by Mario G. Trinchieri, filed on 12/30/74 and having U.S. Ser. No. 537,621, abandoned, and assigned to the same assignee as the instant invention.
2. "Apparatus for Interference Protection" invented by Mario G. Trinchieri, filed on 5/7/76 and having U.S. Ser. No. 684,345 and assigned to the same assignee as the instant invention.

BACKGROUND OF THE INVENTION

1. Field of the Invention

This invention relates generally to computer systems and more particularly to a system and method for controlling the interference due to the sharing of resources* (data) in a multiprogramming/multiprocessing environment, both in local and distributed system architecture.

(*) Resource is any element (like a database element) carrying information as input (read) or output (write) for a process. A record, a field in a record, a page of records, a message are examples of resources, in this context.

2. Description of the Prior Art

Electronic computers have grown from first generation hardware characterized mainly by vacuum tubes, to second generation hardware characterized by transistors, to third generation hardward characterized, in the main, by integrated circuits. Along with these different generations of hardware there were different generations of software, wherein first generation software was characterized mainly by machine language, assemblers and subroutines, and second generation software was characterized by high-level languages, monitors and macro assemblers. Third generation software is characterized by operating systems, on-line real-time systems, multiprogramming systems, and data management systems.

The first generation hardware in combination with first generation software, and also the second generation hardware in combination with second generation software were primarily oriented toward batch processing where jobs were executed one at a time. The third generation of hardware/software systems are also batch process oriented; however, because of the advent of multiprocessing, several jobs may be executed in parallel rather than serial and may compete for the utilization of the same database.

The fourth generation system will be capable of satisfying even higher parallelism among the activities. Real time operations, that impose constraints on response time requirements, and the necessity of adequate performance/cost ratios impose a multiprogramming/multiprocessing environment where the risk of interference among the activities is very high. Proper control of interactions among processes is vital. Some interactions are desired and planned, like the ones based upon the exchange of messages, but some are purely accidental and may derive from unplanned events, like the shared utilization of a record, and they must be carefully controlled. Hardware and software will cooperate in this operation to insure safety at the minimum overhead cost. The fourth generation system is also characterized by distributed system architecture, where processing and data are distributed among physically separated computer nodes.

Processing in the first generation hardware-software computer systems was relatively straightforward: for each job or transaction a process generally ran with little or no interruption until the job or transaction was completed. Many jobs such as the compilation and execution of a high level language program could and did run as a single uninterrupted process. (Note that a process is a concept implying the execution of some activity and should not be confused with the concept of a program or procedure which is the description of an activity and can be used by one or more processes at the same time.)

The coexistence of independent activities in a multiprogramming/multiprocessing environment is developed later. In such an environment many users are demanding service simultaneously and it is natural to conceive of multiple processes competing for resources within the computer system. Each process consists of the execution of a program (i.e. an ordered collection of instructions) on the basis of data and other pieces of information in order to perform a job or some part of that job. Where many such processes are demanding simultaneous attention from the system, the task of controlling and allocating resources (data) to such processes, particularly in view of the requirements of fourth generations systems, becomes extremely complex.

Generally the processes are controlled by an operating system which implements primitives issued by the process and enforces a general mechanism of control. The control for the sharing of resources can also be implemented as a separate entity.

At any rate, the conventional techniques of process control introduce only partially efficient mechanism of protection against interferences of one process from another. Beside being confined inside subsystems (the Database Manager in general) instead of considering the system as a whole, they operate in a conservative manner. They do not intervene when the risk of incorrect results is detected, but they enforce conservative limitations which allow only a few sequences of access that are known to be safe.

This way of reasoning has created methods based upon preassignment and locking of resources. This basic concept is the one of assigning a resource (in a computer system, a database record, a page, etc.) to one process user at a time, until completion of the process. More refined mechanisms limit this "exclusive" mode to the case where the resource is going to be modified by the process, and allow a "shared" mode of access to a resource when it is going to be "read only" by the process-users.

None of these mechanisms offers the maximum of accessability that could be theoretically granted, and they present some inherent drawback (as unnecessary deadlocks) and/or may imply not trivial overhead.

These limitations did not stem out of lack of interest for an efficient manner of getting higher throughput from the system, but rather from an inadequate knowledge of the interference mechanism itself. What is needed for fourth generation systems is a firmware/hardware mechanism which efficiently controls or monitors the activities, provides processes with protection from other processes and allows high level of sharing and therefore of productivity.

OBJECTS OF THE INVENTION

It is a primary object of the invention to provide improved apparatus for the interference protection among processes in a multiprogramming/multiprocessing environment with local or distributed system architecture.

It is another object of the invention to provide a family of systems and methods for protection against interference and associated provisions against additional inconveniences (like secondary aborts, excessive space requirements for temporary storage of uncleared version of the resources, etc.).

It is a further object of the invention to provide a computer system with a family of hardware/firmware instructions designed to reduce overhead and increase efficiency in the implementation of the above-mentioned new systems and methods.

It is an additional object of the invention to provide mechanisms and/or a set of hardware/firmware instructions to be utilized in any environment or application where the requirements or the mathematical models are similar to the ones discussed in conjunction with the preceding objects.

SUMMARY OF THE INVENTION

The foregoing objects are achieved according to one embodiment of the invention and according to one mode of operation thereof by providing a data processing system with an organized set of recorded observations and a special type of instruction to operate on it, and executing a procedure that utilizes such instruction to ascertain the legitimacy for a process to utilize a resource (e.g. access a record). The request to utilize a resource for a specific operation can be approved (and, in some instances, delayed) or redirected or rejected. Rejection initiates appropriate restoring actions.

More precisely:

The mechanism of protection monitors every request issued by any process, observing the relationships (precedences) that the request implies if approved.

The relations are tested against the already approved and recorded relations.

If they fit into the preexisting picture the new relations are also approved and recorded. The request is therefore approved (for immediate or delayed execution).

If they imply instead an absurdity (a loop of precedences or equivalent inconsistency), the mechanism suggests the appropriate redirection of the request or a corrective action to take place.

Variations of the mechanism include the way the precedences are recorded, which information is assumed as a basis for the detection, the mechanism used to recognize the precedences and the formation of a loop among them or the existence of equivalent inconsistency, the special instruction adopted.

Other main variations include the addition of collateral protections and the type of action that is suggested for recovery.

BRIEF DESCRIPTION OF THE DRAWINGS

FIG. 1 indicates the basic elements of the environment where the invention applies.

FIGS. 2, 2a, 2b, 2c, 2d, and 3 illustrate examples of interferences.

FIGS. 4, 5a, 5b, 5c, and 5d provide a graphical representation of relationship among processes.

FIGS. 6a and 6b present the Matrix of Relations (a tool for the invention) and a corresponding graph.

FIGS. 9a, 9b, and 9c illustrate the Utilization Tables, the Matrix of Relations, and the Affected Resource Lists, basic tools of the invention.

FIGS. 17a and 17b illustrate two hardware implementations of the same instructions of the invention.

FIGS. 20a and 20b illustrate two hardware implementations of the same instructions of the invention.

GENERAL DISCUSSION OF BASIC CONCEPTS

1. ENVIRONMENT

Figure 3:
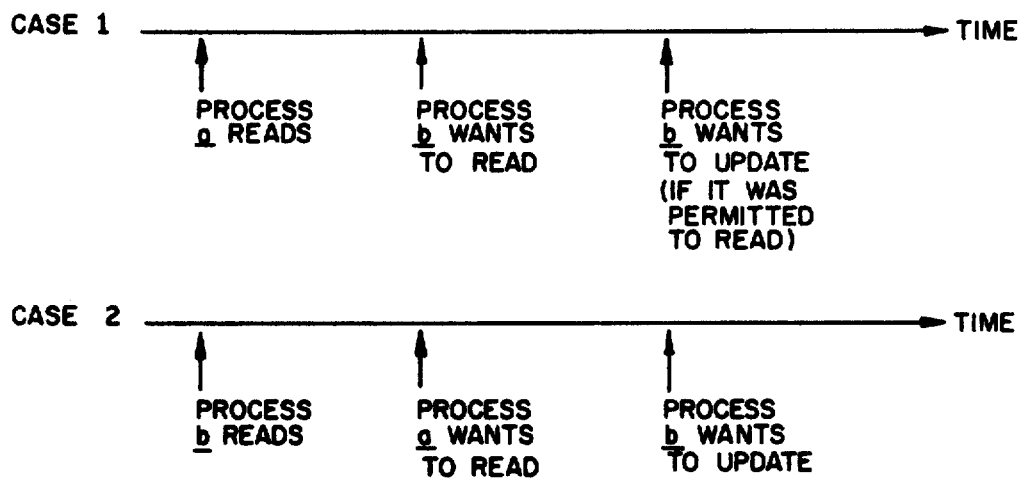

An environment is utilized (e.g. a computer system) where $n$ independent activities (e.g. processes) are simultaneously executed. The activities may utilize (e.g. read or write) some out of $m$ resources (e.g. database elements as records, pages, etc.) to perform their tasks.

The nature of the activities is such that if they were executed one at a time in any sequence [1] till completion, the fact that a resource has been utilized by more than one activity is not an "interference".

[1] The activities (processes) which are considered throughout the text are independent i.e. they may be executed in any sequence whatsoever in a uniprocessing environment.

When, instead, as in this environment, the activities are carried on with a degree of simultaneity, the fact that a resource can be utilized by more than one activity may lead to wrong results. The system, therefore, must offer the necessary protection against the occurrence of such an interference.

The theoretical nature of this interference has been disclosed by the author in a paper entitled, "On Managing Interference caused by Database Sharing", by Mario Trinchieri. (Published by Alta Frequenza, November 1975.)

This leads to an entirely new class of mechanisms of protection.

Here and in the joined article [2] the new concept of interference is described. The implementation of some leading apparatus of this new class is also presented.

[2] Mario Trinchieri: "On Managing Interference caused by Database Sharing".

2. DESCRIPTION OF THE PROBLEM

The basic elements of our environment are those indicated in FIG. 1. The Integrity System I.S. is the element where the protection mechanism resides.

To describe the problem let us first assume that the activities (we will call them processes, or more precisely process-phases, with reference to the computer environment) were executed one at a time. They will access some resources (to read, write or update an information). Since one process is always terminated before another process is initiated, there is no interference among them. No mechanism of protection is required.

Example

Process a accesses a record containing the balance (100 $) of the account of Mister X, to read it. (Step 1). Then process a computes the new balance resulting from a withdrawn that Mister X performed (100−10=90 $). (Step 2). Finally process a accesses again the record to update it, i.e. to write the new balance (90 $). on it. (Step 3).

Process b, then, is activated which performs another operation (a deposit) on the same record of Mister X. It reads (90 $) (Step 4), it computes 90+20=110 $ (Step 5), it writes 110 $ (Step 6).

Process a and process b do not interfere.

The sequence of events is illustrated in FIG. 2, Case A.

Another perfectly legitimate sequence of actions may be the following sequence: process b is executed first, and process a is executed second. Case B of FIG. 2. Let us now suppose that from the previous uniprocessing mode, we moe into a multiprocessing mode: process a and process b are simultaneously active.

The interest for such a mode is dictated by the higher utilization of the system and therefore the higher throughput that can be achieved in general, provided a mechanism of protection against interference exists. To illustrate the risk of interference, let us consider again the example case.

Process a and process b both read the old balance before any update, perform their computations on this basis, and write down their conclusions. The first of the two writings (case C of FIG. 2) is overwritten by the second (as in any case must happen) but the final value is wrong.

The interference occurs because the two processes happen to operate on the same old balance. Since this event has only a marginal probability to occur, the simultaneity of operation is in general useful, provided cases like the above one are taken care of by a built in protection mechanism.

The interference that the example illustrates for the case of two processes and one record can involve in general any number of resources and processes in more or less complex patterns, as it will be discussed later. The mechanism of protection must be able to recognize any of them and provide for adequate actions.

3. THE STATE OF ART

The mechanisms of protection implemented so far are usually based upon locking or assigning resources to the processes. Their effectiveness could be explained on intuitive basis.

For instance: The resources needed by a process, if known in advance, are assigned (preassigned) to that process and made available to other processes only when the owner process is terminated. Alternatively, the resources are assigned to a process as soon as the need for their utilization by the process becomes evident.

In the example of the previous section (Case C), the resource, once first utilized by process a, would have been assigned to process a upon completion, and process b could have only waited.

These assignments and locking procedures can provide protection for multiprocessing environments; however they do not provide all the sharing capability that a system could afford, and they are not immune from other drawbacks.

To illustrate this point let's consider another example. Process a wants to read a resource; process b wants to read the same resource and update it. FIG. 3.

A method of "exclusive assignments" locks the resource to the process that first reads it. The other process cannot access it and has to wait until the first process is terminated and the resource released. This results in a loss of time for the waited process.

Another method can be devised that allows a resource to be in "shared read" mode or in a "shared read/exclusive write" mode.

This method will allow the first two reads and permit process b to write only when process a is terminated. This may or may not result in a delay of process b, depending upon the relative timing.

In any case the delay is unnecessary because the reading by a would not have caused interference.

The methods proposed (see next section) recognize this fact.

4. THE NEW APPROACH

The basic idea is founded upon the observation that, by definition, there is no interference in a uniprocessing environment (see Section (2).

Therefore if we can assure that in a multiprocessing environment the resources are accessed by the various processes in a sequence that could have occurred in a uniprocessing environment, interference cannot occur.

In moe formal terms, we may define an interference as "the occurrence of a sequence of accesses that could not have occurred in a non-shared (or uniprocessing) environment and that cannot be shown to be equivalent to one of them".

The addition of the "equivalence" clause derives from the fact that what really matters is not the actual sequence fo accesses but the data involved in those accesses. In particular it is absolutely irrelevant that a resource is read first by a process a and then by b or the other way around, provided, of course, the resource had not been altered in the meantime.

To clarify this basic aspect, let us consider the example of Section 3. (FIG. 3).

The sequence of case 1 is typical of a uniprocessing environment, when process a runs first, followed by b when a is terminated. The sequence is considered therefore safe by the new approach, and the corresponding mechanism of protection permits it to happen without any delay for process b, no matter whether a is already terminated or not.

The sequence of case 2 cannot have occurred in a uniprocessing environment because either b had to follow a or viceversa. Nevertheless the new approach recognizes the fact that a would have read exactly the same values of a had read before b; that is, the new approach recognizes that the sequence of case 2 is equivalent to the one of case 1.

Therefore the mechanism of protection considers it safe and allows the accesses to occur without delay.

Let us now examine the cases illustrated at Section 2 (FIG. 2).

A sequence like the one of case A and B is approved because it is consistent with a uniprocessing environment. A sequence like the one of case C cannot occur in a uniprocessing environment (where only cases A and B are possible), nor can it be considered equivalent to case A or B (because the data involved are different).

Therefoe the mechanism intervenes in such a case C to protect the integrity of the results.

We have already examined the actions of conventional methods with reference to the example of Section 3.

The actions resulted in unnecessary delays.

It is interesting to note that in this case C of FIG. 2 their actions, instead, would habe resulted either in a convenient delay of process b or in a deadlock (deadly embrace) situation if they had allowed both processes a and b to read. This latter situation (deadlock) arises from the fact that the resource, already assigned in a shared reading mode, cannot be further utilized by a nor by b to write: both processes get caught in a situation without a way out.

5. THE DETECTION MECHANISMS

It should be clear by now that whereas the conventional mechanism of protection operates by limiting the accessibility to the resources (and therefore in general the throughput of the system), the new proposed mechanisms pose no limitation but continuously monitor the actual utilization of the resources and intervene only when they detect a dangerous pattern.

The detection mechanism is the key of these protections.

The basic concept has been presented in the previous section:

"an interference is the occurrence of a sequence of accesses that could not have occurred in a non-shared case and that cannot be shown to be equivalent to one that could have occurred in a non-shared case."

This concept is implemented by establishing which "precedences" (in time) among the processes are revealed by the actual sequence of accesses to the resources, and by rejecting the occurrence of a loop among precedences.

A loop of precedences is obviously absurd because it implies that a process precedes and at the same time follows another process.

To clarify this point let us consider again the examples of FIG. 2.

Case A reveals a situation where the actions of process a entirely precede the actions of process b. (See FIG. 2a). No loop. Actions are legitimate. Case B reveals an opposite but still legitimate sequence. (See FIG. 2b.)

Case C. Since process a writes on the resource after b reads it, it is obvious that, up to that moment, the precedence "b precedes a" has been established. (See FIG. 2c.)

As soon as process b tries to write on it, the additional relation "a precedes b" must be recognized and added to the diagram. (See FIG. 2d.)

This would create a loop that cannot be tolerated by the mechanism of detection because of its absurdity.

Figure 4:
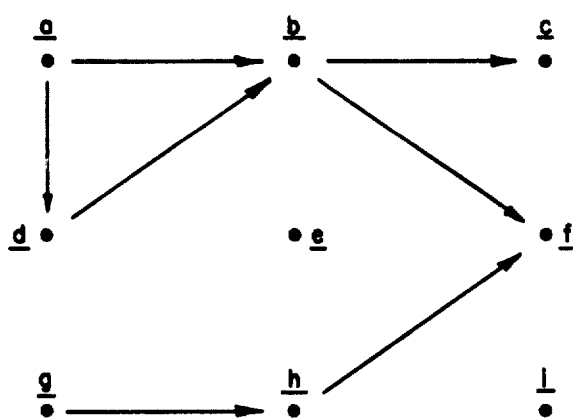

The example refers to a two process, one resource situation. The general case deals with n processes and any number of resources. The corresponding diagram has one node per process (FIG. 4) and continuously evolves reflecting the activity in the system.

Some nodes can show many relations, some can have no relations at all.

A variety of mechanisms of protection can be built around the basic concept. Some implementations have been described in the attached article.

They all share a common feature: the search for a loop or equivalent contradiction.

6. THE RULES FOR DETECTION AND THE PRINCIPLE OF INTERFERENCE

Figure 5A:
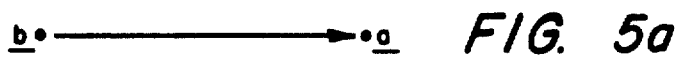

In the example of the previous section in precedences were introduced on a rather intuitive basis. The rules upon which precedences can be established can be described as follows:

When a process a reads a resource that was written by a process b, the time sequence "a follows b" is noted. (See FIG. 5a.)

Figure 5B:
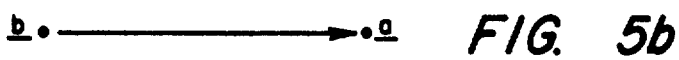

When a process a writes a resource that was previously read or written by a process b, the time sequence "a follows b" is noted. (See FIG. 5b.)

When a process a reads a resource that was previously read by a process b, the time sequence "a follows b" is not noted because the results do not change if the time sequence is reversed.

Based upon these rules an unacceptable event is: an event that contradicts previously established time relations, namely: an event that closes a loop. (See FIG. 5c.)

In a more formal way the principle of interference is as follows:

"When independent processes, simultaneously executed, share resources (e.g. data),
  a process that reads a resource is said to follow the process that wrote it.
  a process that writes a resource is said to follow the process that read or wrote it.
If the set of precedences so established forms a loop, an interference has occurred that involves the processes joined in the loop."

It may be useful to note, for any practical implementation of the new concept, that it makes the mechanism of protection more advanced but not necessarily more complex. As a matter of fact the application of the concept requires to list the processes-users in the system and the type of use (read/write) for each resource (each list contains only the non already cleared processes)

This information is fundamental to any mechanism (obviously mechanisms that allow very limited sharing have degenerated or very short lists).

The detection of the precedence loop, that is peculiar of this new class, is not by itself more complex than a correspondent detection of deadlocks, necessary in conventional mechanism As a matter of fact the new class can be implemented via the embodiment of a new instruction, one macroinstruction or a small sequence of instructions, in software, firmware or strictly hardware, depending upon the desired degree of tradeoff between hardware and software.

For a generalized interpretation of the new concept it is useful to note that the expression "a process reads (or writes) a resource " applies to any activity that operates on a resource deriving information without altering it (or adding information and altering it).

7. CONSEQUENCES OF THE BASIC CONCEPT

The basic concept provides a basic understanding of the interference phenomenon and puts in a unique light all the mechanisms for controlling shared accesses to the resources. It may be used both to suggest a new mechanism and methods of protection and to check the validity of the existing ones.

A protection mechanism is a system capability that permits the simultaneous execution of processes that have been conceived as if they were executed in a uniprogramming environment where the risk of interference is absent.

The basic approaches can be followed to provide the necessary protection apparatus:

1. Allow free access to the resources, but monitor the actual sequence of operations.
2. Put properly chosen limitations on the freedom of operations so to exclude unwanted patterns.

To these two, a third class of solutions must be added:

3. Combine the monitoring of the first approach with the impositions of restrictions as in the second.

Absence of a general criterion on how and what to monitor suggested the second approach for the conventional methods (assignment or locking methods). The basic concepts of interference provides the monitor for the first and the third approaches. As examples of the first and third approaches (the new methods) we indicate the "Free Ride" (a Shared Read/Shared Write method) and the "No Dependency" (a Shared Read/Exclusive Write method), described herein infra.

It is important to note that the imposition of restrictions, typical of the third class, leads to the introduction of the "Wait" status as a possible outcome of the mechanism, beside the approval for continuation or the order for a restoring action.

The third class encompasses the first which becomes a sort of subclass.

It is therefore to this (third) class that the invention to be taught infra mainly refers. The class, in its broad definition, includes any combination of the monitoring action with the imposition of extra restrictions for whatever reason.

The principle of interference establishes the correctness of a "go ahead"; the additional restrictions may operate to reduce recovery, space requirement, etc. The "No Dependency" is a special case of this class and is discussed in section 10. The general case is presented at section 11 and later on.

8. RESTORING ACTIONS

To discuss a protection mechanism completely, it is necessary to describe also the course of action that the mechanism follows when an interference occurs.

Assuming that the last access, the one that closes the interference loop, has not yet been actuated, there are two possible alternatives:

1. Avoid that access.
2. Eliminate some time relations so as to avoid the interference loop.

The first alternative does not mean to change the request issued by the process, which would imply a capability that we generally cannot expect a process to have: It means to satisfy the request with a different access. This is the case of a request to read. If it is possible to access a previous version (edition) of the same resource, the nonacceptable time relation is reversed (*) and becomes acceptable (solid line $p_1 \rightarrow p_2$ of FIG. 5d instead of dashed line $p_2 \quad p_1$).

(*) The reader, which was not allowed to "follow" the writer of a certain version, is now requested (and allowed) to precede the same writer.

Note that this "historical" reading, although highly desirable, is not a feasible solution in certain areas of implementation.

The second alternative is implemented by aborting one or more processes. Various methods can be suggested to decide which process or processes to abort, since more than one solution is generally possible. The next two subsections propose and discuss very simple methods offering a quasi-optimal solution and more sophisticated algorithm.

ELIMINATION OF AN INTERFERENCE LOOP

Let us establish some basic points for the discussion.

1. We assume that a previous edition (also called a "before" edition) of a resource is saved when a process first modifies it and is kept until the process that modified it has been cleared. [2] (A stack of previous editions can exist for a resource). Therefore the system can abort selected processes and restore the modified resources. Lack of this capability would have required indiscriminate rollback of all processes and resources to some convenient checkpoint.

(2) A process could be cleared when it is successfully terminated and all the processes on which it depends have also been cleared. Since it may have interfered with some other process and we want to retain the option of aborting it if convenient we prefer to clear a process "when it is successfully terminated and all the processes it follows have also been cleared."

2. To eliminate an interference it is immaterial which process or group of processes is aborted (primary aborts), provided the suppression opens the loop.
3. Primary aborts may cause other processes to abort (secondary aborts) if the validity of the latter processes depends upon the correct termination of the former.
4. The damage associated with the abortion of different processes may be judged to be different and a figure of weight defined for each process, based upon such factors as the number of resources that have been modified, the existence of messages already exchanged with the external world, priorities, and so on.

It is now obvious that the following method can be proposed to eliminate an interference loop:

1. Any process or group of processes which when aborted opens the loop is considered a candidate.
2. The dependent processes are identified for each candidate.
3. The figures of weight for each candidate and its dependents are added up.
4. The minimum weight identifies the optimum candidate.

An alternative to this method is the following very simple rule:

"If a request cannot be granted because it implies the relation "$p_1$ follows $p_2$," whereas $p_2$ already follows $p_1$, the process $p_2$ and its dependents abort."

The rationale for this method is very simple: First, the abort of $p_2$ is sufficient to open the loop. Second, it is highly probable that $p_2$ causes a low number of secondary abortions, close to the minimum, because $p_2$ is the last process in the identified interference loop.

The rule is very attractive because the lack of computations and bookkeeping is likely to outweigh the advantages of a possible better choice offered by a more sophisticated method.

With this method the entire policy for the restoring activity can be summarized in the following statement:

"If a request for a resource implies a relationship '$p_1$ follows $p_2$', whereas $p_2$ already follows $p_1$, and a previous version of the resource cannot be used to circumvent the problem, $p_2$ aborts with its dependents."

ELIMINATION OF MULTIPLE INTERFERENCES

If a request implies more than one relation that cannot be accepted, the restoring procedures indicated above can be used to eliminate the interferences one at a time. Nevertheless it would be wiser to consider the problem in its entirety to optimize the overall course of action, rather than to suboptimize it.

The method based on minimum weight would in this case examine as alternative candidates those groups of processes which, when aborted, open all loops of interference. The optimum candidate is the group which totalize the minimum weight. The method is feasible but onerous. To reduce computations and bookkeeping, a simple rule is even more important in this case than for the single interference. The rule is the following:

Two candidacies are considered. The first candidacy includes the requesting process and the process that depend upon it.

The second candidacy is the list of all processes which appears to interfere with the requesting process, plus the process which depends upon them.

If the first candidacy includes fewer processes than the second, the requesting process and its dependents are aborted, otherwise the processes in the list are aborted.

A refinement of this rule considers an intermediate additional step of "minimization" of the list, before the final decision is taken.

Each process in the list is selectively tested to ascertain whether its abortion (and the abortion of its dependents) cures not only the interference of its "direct pertinence", but other interferences as well. When this happens other processes can be eliminated from the list, which is so reduced to a minimum.

9. THE "FREE RIDE" TECHNIQUE OF PROTECTION

The "free ride" approach belongs to the first class of methods described in Section 7 above, and can also be called the shared read/shared write approach since all resources can be shared for both reading and writing purposes until the monitor, applying the principle of interference, signals the need to change the course of action.

The mechanism can be summarized as follows. (For a complete description, see the Appendix I in the previously referenced paper.)

1. Each resource keeps note of its users and the type of usage (i.e., Writer name, Reader 1 name, Reader 2 name, . . . ).

2. When an access is granted, the mechanism memorizes in its private records those relations that apply to the specific access according to the rules:

a. A request to read implies that the requester "follows and depends upon[3] the writer" of the requested (version of the) resource.

[3] The "dependency" is added to the "time" relation to form the composite "follows and depends" statement so that the mechanism has not only the information necessary (the time relations) for the interference check but also those necessary to identify the processes that have to abort (secondary aborts) when another process aborts (primary abort).

b. A request to write implies that the requester "follows and depends upon[4] the writer" and "follows and does not depend upon the readers" of the requested (version of the) resource.

[4] A "does not depend" version of the mechanism is possible but less convenient.

3. Any request to access a resource has to be approved by a mechanism which checks that either the implied relations have already been accepted and memorized on another occasion or that they can be accepted because they do not close some of the preexisting relations in a loop (principle of interference).

4. If the request fails the check a. A read is rerouted to a previous version of the resource. Check is repeated until the appropriate version is found. The occurrence of the access and the new relations implied (if any) will be regularly memorized.

b. A write causes the abortion of the intruder(s) and its (their) dependents; then the activity is resumed.

(1) "Intruders" are the processes the abortion of which is suggested by any of the rules described in Section 8 to eliminate the identified interferences.

(2) "Dependents" are all processes so revealed by the chain of relations "follows and depends" previously recorded by the mechanism.

The invention is a straightforward practical application of the criteria discussed so far in this paper. Its main advantages over the conventional techniques is that it allows maximum sharing of resources by eliminating the wait status, and reduces the cases of interference to be cured by abort to a level well below the one of "deadly embraces"[5] for the same operative conditions.

(5) Deadly embrace (deadlock) occurs when the owner(s) of the desired resource is (are) also waiting for another resource and so on in a closed loop.

This last, very important aspect results from the use of historical readings that may solve, without abortions, situations that would have caused deadly embraces in a conventional protection mechanism.

10. THE "NO DEPENDENCY" MECHANISM

This mechanism belongs to the third approach indicated in Section 7 for a protection mechanism.

The rationale for its existence is the desire for additional features: to restrain abortions and to curb the amount of storage required for the non-cleared versions of the resources that are modified by the processes.

This mechanism offers some of the inherent capabilities of the free ride, but avoids secondary aborts and limits the storage to one "historical" version at most per resource. It combines the rules of the free ride with the additional restriction that only the time relations associated with a nondependency are allowed ("follows but does not depend").

The resulting approach has the following characteristics:

1. Each resource can have at most one version in a non-cleared status (i.e., whose creator has not yet been cleared).

2. A request to read a resource is addressed to the last cleared version of the resource, unless the requester itself has created a new edition of it.

3. Read and write requests must pass the principle of interference test.

4. Wait status is possible.

5. Interference causes primary aborts alone.

It is interesting to note that assignment rules alone could not create the same mechanism: The detection test is necessary because the interference paths can be very complex.

10.1 THE NO DEPENDENCY MECHANISM — DETAILED DESCRIPTION

The hypothesis is that independent phases[1] of various processes run simultaneously, sharing a database, and that each process has been programmed as if it were alone in the system. The mechanism provides the required protection against interference.

[1] This subsection explicitly refers to the phase (or steps) of the processes, since this description is implementation-oriented. A phase indicates specifically any part of a process which requires that the database and any other source of information appear unchanged by others during the execution of that part and until completion. Obviously, the subdivision of a process into phases can only be made by the creator of the process procedures (i.e. the programmer) or by other equally knowledgeable persons. The whole process is assumed by default as a phase and there is no obligation to declare any existing finer subdivision of it, but a subdivision into phases is convenient to reduce the probability of interferences and the actual bookkeeping of the mechanisms of protection. Throughout the text (with the exception of this subsection as an example) the term process is used for simplicity instead of the more specific term process-phase to name the entities monitored and cured by the mechanisms, being understood that the mechanisms of protection apply equally well to any level of subdivision of the processes declared by their creators.

The basis information that the mechanism maintains in order to fulfill its purpose includes:

1. The identity of the users (process phases) and the type of usage (i.e. "Reader 1 name, Reader 2 name, . . . , Writer name") for each resource for which at least one user is still in the non-cleared status.

2. The updated figure of weight of each process phase, unless the simplified rules of recovery are adopted (see Section 8).

3. The relations noted among the process phases, running or terminated, but still not cleared. These relations are here supposed to be organized in a matrix with one row and one column for each process phase.[2] Each element of the matrix (FIG. 6a) indicates that:

a. No relation has been noted (symbol 0), or b. Process phase in the row follows but does not depend upon process phase in the column (symbol 1), or c. Process phase in the row follows and waits for the termination and clearance of the process phase in the column (symbol 3).

[2] Equivalent tools can be used for the same purpose (lacunar matrix, graph, etc.). Theoretically the record of these relations is not needed because they can be derived repeatedly from the Writer/Readers strings mentioned above. However this would slow down the mechanism.

Every time there is a request to access a resource, the mechanism has to approve it. The mechanism operates as follows:

1. First it identifies any relations implied by the request, if any, a. A request to read, addressed to the cleared version, implies a relation if there is a successive non-cleared version of it: its writer "follows but does not depend" upon the reader.

b. A request to write implies that the requester "follows and waits" for the writer of the non-cleared version of the resource, if there is already a non-cleared version of the resource, or "follows but does not depend" upon the readers of the resource, if there is not a non-cleared version of the resource. If the writer or a reader is the same as the requester, no relation is noted.[4]

[4] This means that the detection mechanism is invoked only in those situations where a conventional assignment method would have denied the access and initiated a check for deadly embraces. This substantiates the statement that overhead is not bigger here than with conventional methods.

2. Each relation, identified above, is checked against the matrix to see if it has already been noted (to this extent symbols 1 and 3 are considered equivalent, since the check is looking for time relations only).

3. If the relation is not in the matrix, it must be established whether its introduction in the matrix would close a loop. The check is simple:

a. Consider the process phase that appears as the first term $(p_1)$ in the relation ($p_1$ follows $p_2$) to be tested.

b. Examine the corresponding column in the matrix.

c. For each element of the column that carries the symbol 1 or 3, consider the corresponding process phase, head of the row.

d. For every process phase so identified, execute recursively steps (b), (c) and (d) until exhaustion of all branches or until process $p_2$ is found.

e. Exhaustion means that the relation is acceptable; encounter with process $p_2$ indicates instead the formation of a loop.

An efficient implementation of the check can validate simultaneously all relations "$p_1$ follows $p_2$", "$p_1$ follows $p_3$", . . . etc., implied by the request. (See THE FUNDAMENTAL CHECK FOR INTERFERENCE and following sections).

4. If the request to access the resource does not imply any relations or the relations already exist in the matrix or they can be safely added to it, the request is approved.

If the request is approved, the mechanism updates its records (matrix, etc.) and either the operation continues as planned or, if it requires to write on a resource that has already a non-cleared version, the process enters the wait status.

If the request is rejected, the following course of action is taken:

1. Wait for the non-cleared version, for a read request. If a read cannot utilize the cleared version of the desired resource, but must be addressed to the non-cleared version, the reader enters the wait status. The mechanism will update its records accordingly.

2. Abortion for a write request. According to the simplified method discussed in Section 8 for the case when only one relation opposes the request, the process-phase that appears as the second term in the rejected relation aborts (no secondary aborts exist). Instead, when more than one interference exists, the simplest method of Section 8 suggests the abortion of the requester itself.

Alternatively, if the application justifies it, the optimum candidacy for abortion is identified with one of the more sophisticated methods, also discussed in Section 8.

When a process phase is terminated and cleared or aborted, the matrix of relations indicates the process(es), if any, waiting for this event. The processes can now resume their course, monitored by the mechanism of protection. To avoid unnecessary causes for possible abortions, the mechanism will resume the waiting processes in a sequence that respects the time relations existing among these processes.

The mechanism, as the free ride, is "continuous" in the sense that at any moment a new process phase can enter or leave the system, having been regularly cleared.

A final observation: It is rather obvious how a similar organization can also take care of the general case, where time relations, dependencies, wait statuses are monitored by the mechanism of protection.

11. THE GENERAL PROTECTION MECHANISM

Figure 7:
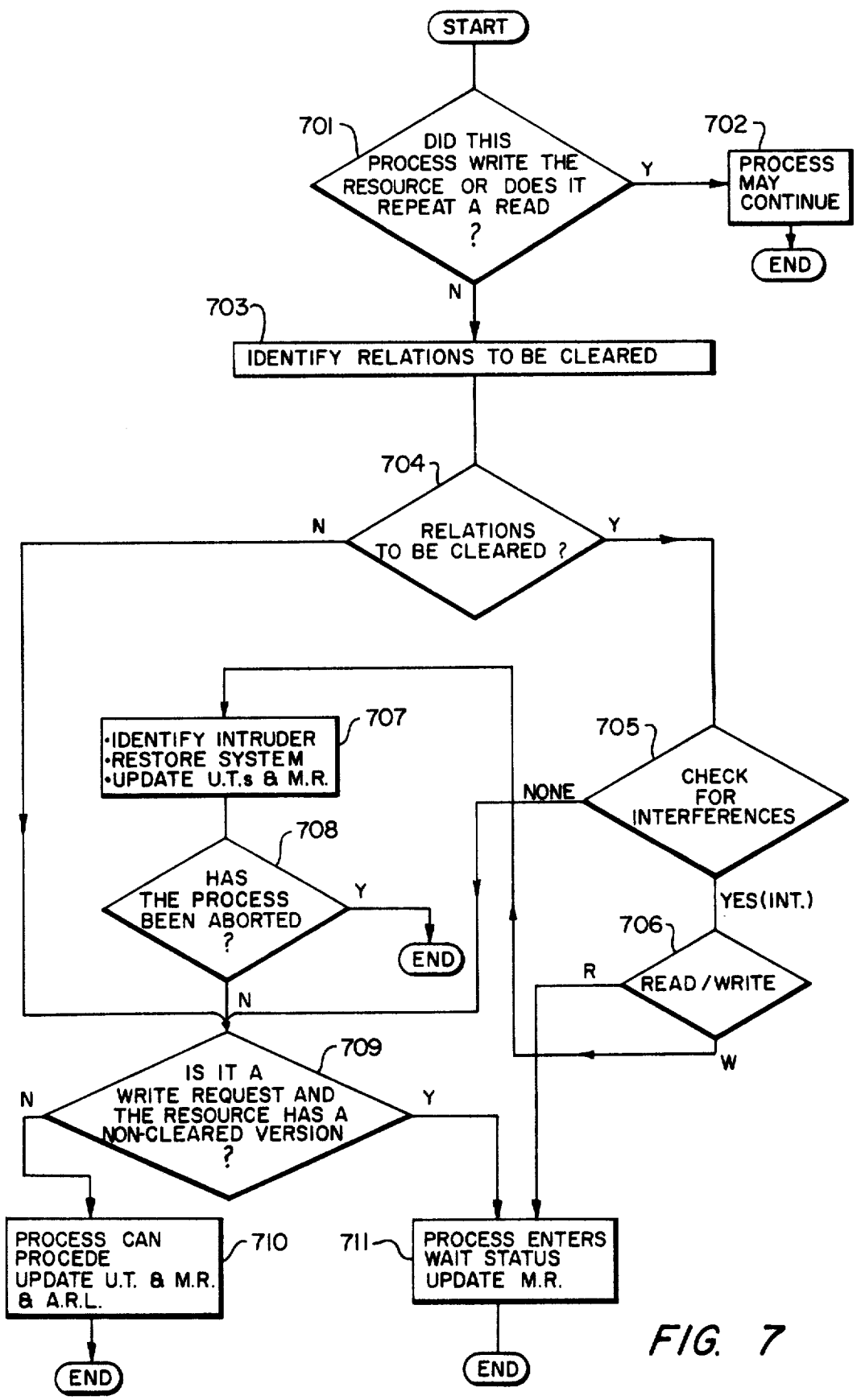
FIG. 7 shows the "No Dependency" mechanism of protection, a preferred embodiment.

The mechanism, that in the No Dependency method intervenes whenever a process attempts to access a resource, can be described as in FIG. 7.

The various diamonds and boxes correspond to the operations examined in the previous Section 10. In particular, the WAIT status is imposed when the access, perfectly legitimate as far as interference is concerned, would cause a "dependency."

Figure 8:
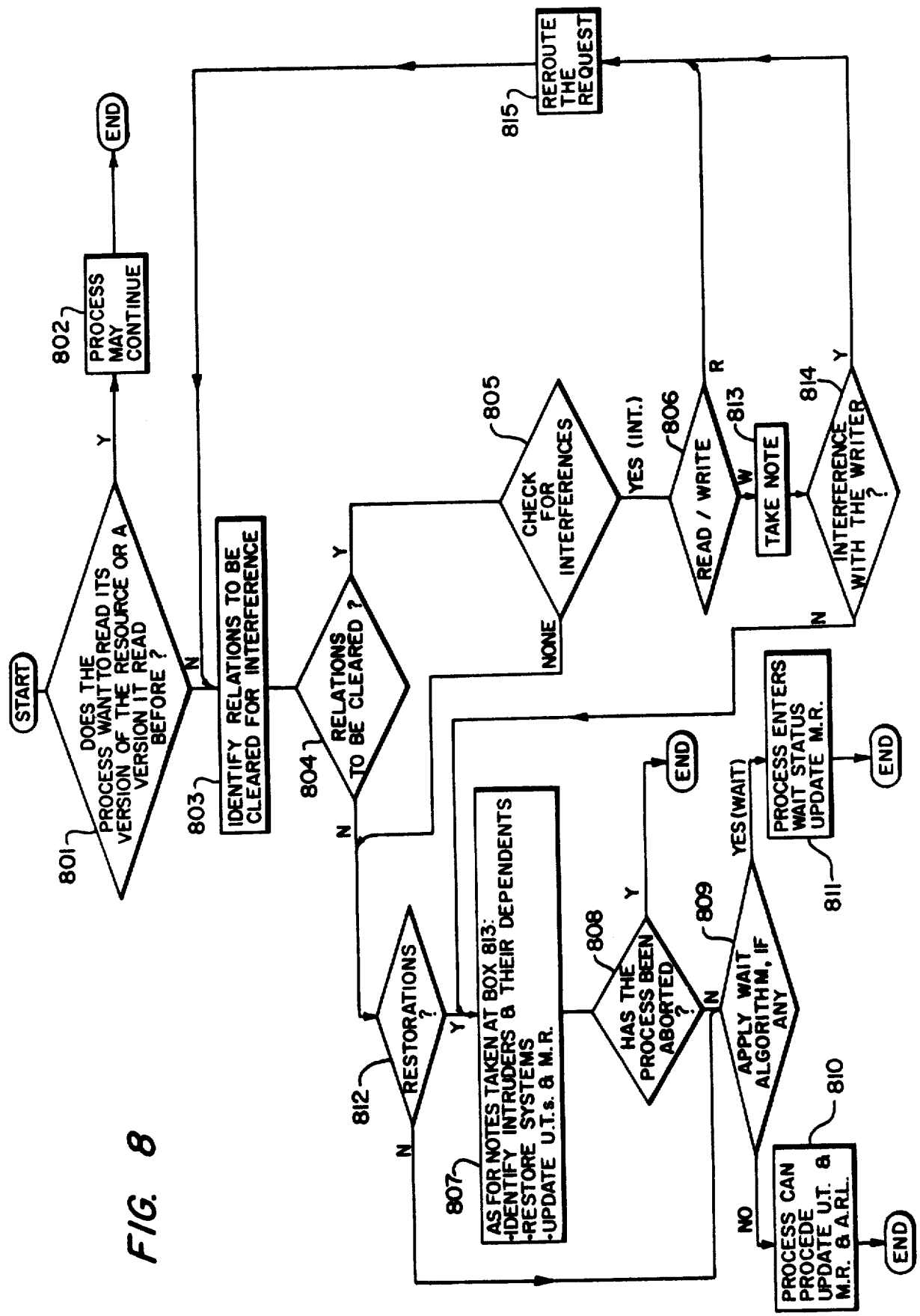
FIG. 8 shows the generalized layout of the mechanisms of protection based upon the invention.

FIG. 8 shows a generalization of the case, where the cause for a WAIT status can be whatsoever.

The details of both FIGS. 7 and 8 are discussed later on, when the preferred embodiments are presented.

To complete a general mechanism of protection, the release of the processes from the WAIT condition must also be provided. This additional mechanism, being complementary to the one that puts the processes into that status, can be better described on a case by case basis.

Any way the release mechanism that is valid for the No Dependency is fairly general and applies to all cases where a waiting process is to be resumed when another is terminated and cleared or aborted. In these cases the Matrix of Relations indicates which processes are waiting for this event. The processes can be resumed, one at a time, in a sequence that respects the relations existing among the processes. Each release is monitored by the mechanism of protection. The details of a mechanism that implements these concepts will be discussed later on (RESUMING THE WAITING PROCESSES).

Note that our discussion on the general mechanism explicitly refers to the imposition of a Wait: as a matter of fact other impositions, like a Reject, could have also been considered. Although we recognize here that our concept of a general mechanism includes additional restrictions whatsoever and not only the ones that lead to a Wait status, we will continue to explicitly refer to a wait as the most representative and likely to occur. (Rejections for security, privacy etc. are most reasonably applied before the mechanism is called into action).

DESCRIPTION OF THE PREFERRED EMBODIMENTS

General Discussion

Figure 9:
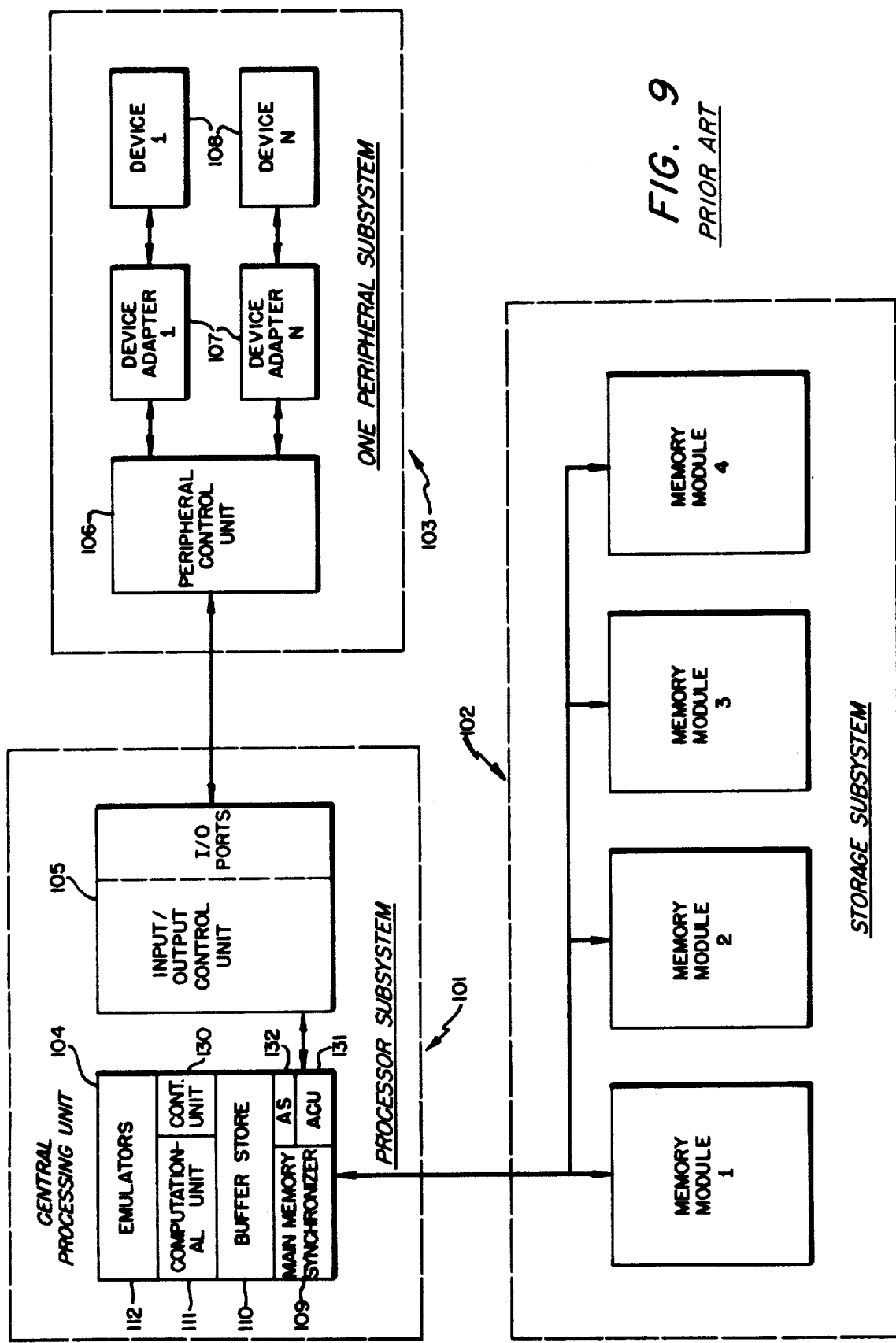
FIGS. 9, 10, 11, 12 and 13 show the basic components of a computer system and details of various subsystems utilized by the invention.

The invention operates typically in a hardware system environment similar to that of FIG. 9 which is a block diagram of the Honeywell Information Systems Inc., Level 60 computer system and more particularly Level 64. Referring to FIG. 9 the subsystems are the processor subsystem 101, the storage subsystem 102, and the peripheral subsystem 103. The processor subsystem contains a central processing unit (CPU) 104 and the input/output control units (IOC) 105. Each peripheral subsystem consists of a peripheral control unit (PCU) 106, a number of device adapters (DA) 107, and peripheral I/O devices 108. The storage subsystem 102 comprises semiconductor memory modules.

One or more of each of these subsystems coexists in the system and may be connected in any of the conventional ways. Typically, the connections, when there are more than one subsystem per type, are via a bus or a crossbar in a unisite implementation. In a multisite (multinode) or distributed implementation (Distributed System Architecture) Communication Subsystems and a Communication Network are also utilized.

The typical environment where the invention operates is one where the above outlined hardware, no matter if in a unisite or a multisite architecture and no matter if described as a large, medium, small or mini system, is utilized under the control of an Operating System that implements a multiprocessing and/or multiprogramming mode of operation. A multiprocessing mode needs a multiplicity of processor subsystems, whereas a multiprogramming mode may be implemented also in a uniprocessor system. In both modes a process is initiated before another process is terminated, and more than one process is simultaneously "alive".

Figure 10:
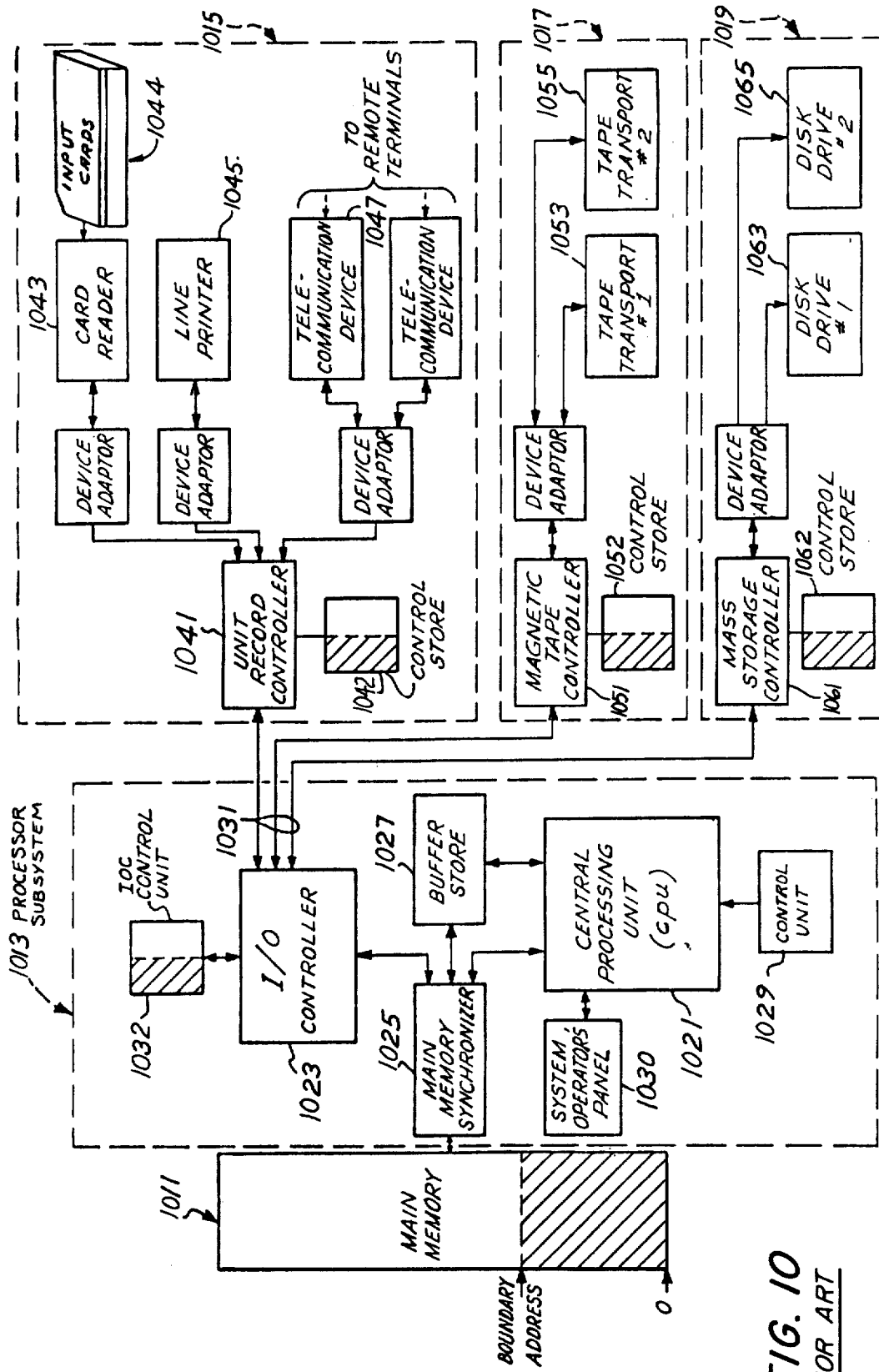

The computing system shown in FIG. 10 is a more detailed diagram of the Honeywell Level 64 computer system and is composed of several coordinated hardware subsystems. These subsystems are: a main memory storage subsystem 1011, a processor subsystem 1013, and three peripheral subsystems 1015, 1017 and 1019.

The processor subsystem 1013 contains a central processing unit (CPU) 1021 and an input/output controller (IOC) 1023. CPU 1021 performs the basic processing operations for the system while the IOC 1023 controls all information exchanges between the storage subsystem 1011 and peripheral subsystems 1015, 1017 and 1019.

The processor subsystem 1013 further includes a main memory synchronizer 1025 and a buffer store 1027. The main memory synchronizer 1025 resolves conflicts for the use of main memory among the CPU 1021, the buffer store 1027 and the IOC 1023. Conflicts are resolved on a priority basis: the IOC has the highest priority followed by memory writers (from the CPU 1021) and then memory reads into the buffer store 1027. The buffer store 1027 is a small, high-speed buffer memory that reproduces selected regions of main memory and interfaces with the CPU 1021 to decrease average memory access time. During each memory read, both the buffer store 1027 and main memory 1011 are accessed. If the information to be fetched is already in the buffer store 1027, the attempt to read main memory 1011 is terminated and the needed information is fetched instead from the buffer store. Otherwise the main memory 1011 is read. Every time memory 1011 is read, the CPU 1021 fetches an entire "page" (32 bytes) containing the desired information. This page remains in the buffer store 1027 for a time to meet future references to further information within the page. Since operation of the buffer store 1027 is invisible to the system user, the program controlling the computer at any given moment cannot determine whether the information it is processing has been fetched from the buffer store 1027 or from main memory 1011.

The detailed operations taking place within the CPU 1021 are controlled to a significant extent (but, as will be seen, not completely) by microprograms stored within a control unit 1029. A control unit of this type is described in U.S. Pat. No. 3,634,883 issued on Jan. 11, 1972 to Leonard L. Kreidermacher, and a detailed, general discussion of microprogramming control techniques is presented in *Microprogramming: Principles and Practices* by Samir S. Husson, Prentice Hall, Inc., (1970). Further detailed description of the control unit is given infra.

Some of the firmware for controlling the operation of the processor subsystem 1013 is written into a zone of physical addresses in the main memory 1011 (shown by the shaded area in FIG. 10), beginning at physical address "zero" and extending to a "boundary address". This additional set of microcode, stored in this "hardware area" of main memory 1011 at the time of system initialization, is unique to the particular system installation and contains information related to the type and status of the particular hardware devices employed, the configuration of the system, and special firmware options selected for that installation. Further control of the processor subsystem may be effected manually through hardware-visible switches and pushbuttons located on the system operator's panel (SOP) 1030.

The IOC 1023 of the processor subsystem provides a data path between any peripheral subsystem and the storage subsystem. This path communicates "channel commands" to the peripheral subsystems and controls the resulting data transfers. IOC 1023 interfaces with the peripheral subsystems via the "physical" IO channel 1031. Directly associated with the IOC 1023 is a read-write control unit 1032 capable of receiving, at the time of system initialization, installation-dependent control firmware (as illustrated by the shaded area in block 1032). In addition, the IOC control unit 1032 stores installation-dependent microcode (which may be in read-only storage as illustrated by the unshaded area of the IOC control unit block 1032). Alternatively, (or additionally), control microcode for the IOC 1023 may be stored in the hardware area of main memory 1011.

Peripheral Subsystems

Each of the peripheral subsystems 1015, 1017 and 1019 includes a peripheral control unit, a stand-alone microprogrammed processor that relieves the load on the processor subsystem 1013 by controlling IO devices during IO operations. The peripheral control units do this by executing instructions contained in channel programs stored in main memory 1011. These channel programs control the arithmetic, logical, transfer, shift and branch operations performed in the peripheral subsystems.

For example, in peripheral subsysten 1015, the control unit employed is a unit record controller (URC) 1041 which can control several low-to-medium speed unit record devices, such as card equipment, paper-tape equipment, telecommunications devices and system consoles. In the example shown in FIG. 10, URC 1041 controls a card reader 1043, a line printer 1045, and a pair of telecommunication devices 1047. In the peripheral subsystem 1017, the peripheral control unit takes the form of a magnetic tape controller 1051 which operates a pair of tape transports 1053 and 1055. The peripheral control unit in subsystem 1019 is a mass storage controller 1061 shown connected to operate a pair of disc drive units 1063 and 1065.

Device adapters (DA) mediate between each peripheral control unit and the devices it controls and contain the dedicated logic necessary to implement communication with a particular type of device. Depending on the type, a DA controls one or several devices.

The major functions performed by each peripheral control unit are:

(1) the transformation of instructions from the processor subsystem into a series of commands acceptable to the appropriate peripheral device;

(2) packing and unpacking data in the form needed by the processor subsystem or the appropriate peripheral device;

(3) keeping the processor subsystem informed of the status of the peripheral subsystem and of the devices under its control;

(4) independently initiating and processing error and recovery procedures; and (5) allowing on-line diagnosis of a given peripheral device without disturbing the operation of other devices.

The peripheral control units resolve conflicts for main memory between devices attached to them, while the IOC resolves conflicts between different peripheral control units.

As illustrated in FIG. 10, the peripheral control units 1041, 1051 and 1061 are connected to receive microinstructions from control stores 1042, 1052 and 1062, respectively, each of which may include both read-write and read-only storage sections. The read-write control storage associated with at least selected peripheral control units allows installation-dependent microcode to be loaded at the time of system initialization to render each peripheral subsystem compatible with the remainder of the subsystem.

Input and Output

The architecture of the system depicted in FIG. 10 is based on the simultaneous operation of the processor subsystem and one or more of the peripheral subsystems 1015, 1017 and 1019. Each of the peripheral control units 1041, 1051 and 1061 is capable of executing a limited instruction repertoire distinct from that of the CPU 1021. A set of instructions which performs a peripheral operation is called a channel program. Channel programs reside in main memory and are accessible by both the processor and peripheral subsystems. Specific processor instructions are used to create a channel program, while the execution of the channel program is directed by the IOC 1023 and a peripheral control unit. Once execution of a CPU instruction initiating a channel program is complete, that program is executed by the IOC and a peripheral control unit and the CPU 1021 is free for other operations.

There is one physical channel 1031 for each peripheral control unit connected to the IOC 1023. It is, however, possible to multiplex several operations over one channel. This gives rise to the concept of a logical channel, which is a logically defined communications path between main memory 1011 and a single peripheral device. Logical channels share a physical channel. Physical channels are associated with peripheral subsystems while logical channels are associated with devices (although several logical channels may be associated with a single device.)

SYSTEM ORGANIZATION AND MANAGEMENT

Systems of the type shown in FIG. 10 are normally controlled by an operating system, an extensive set of procedures which provides for efficient handling of hardware, data, and programmed resources in a multiprogramming environment. All program execution, peripheral accesses, memory accesses, and operational actions required to perform a user's computations are controlled by the operating system.

Work to be performed by the operating system may be defined externally by a series of processes via a job control language. Several processes can be active and sharing resources, but only one process per CPU is actually running at any one instant.

The system shown generally in FIG. 10 provides for multiprogramming and multiprocessing operations which are controlled by the operating system which creates and deletes processes within the system and provides for snychronization among processes. The multiplexing of processes in the CPU 1021 is carried out under firmware/hardware control. Processes are normally started and stopped at the initiation and termination of I/0 operations, during related job handling, and at other times for purposes deemed necessary by the operating system.

Control Unit

Figure 11:
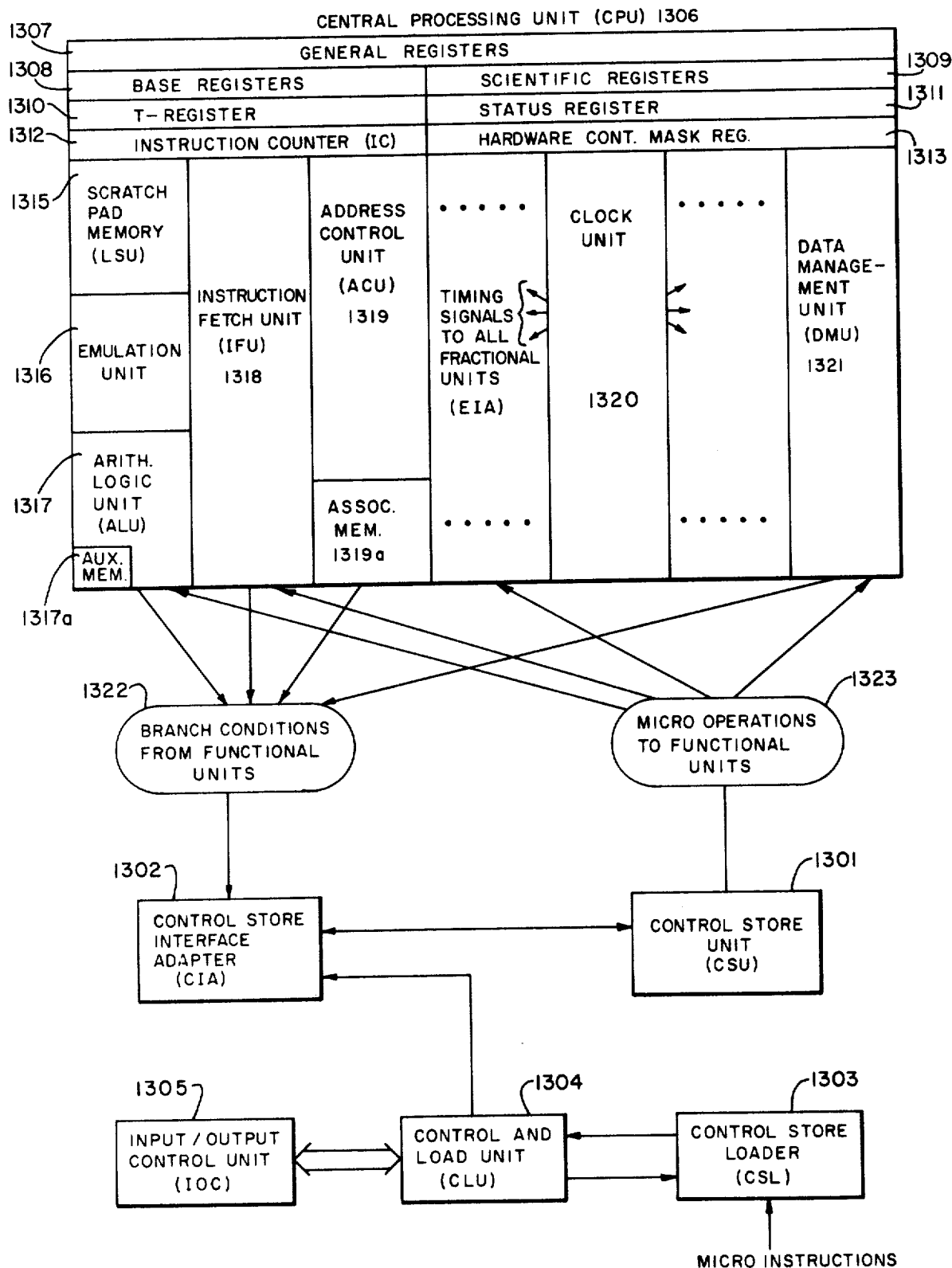
Figure 12:
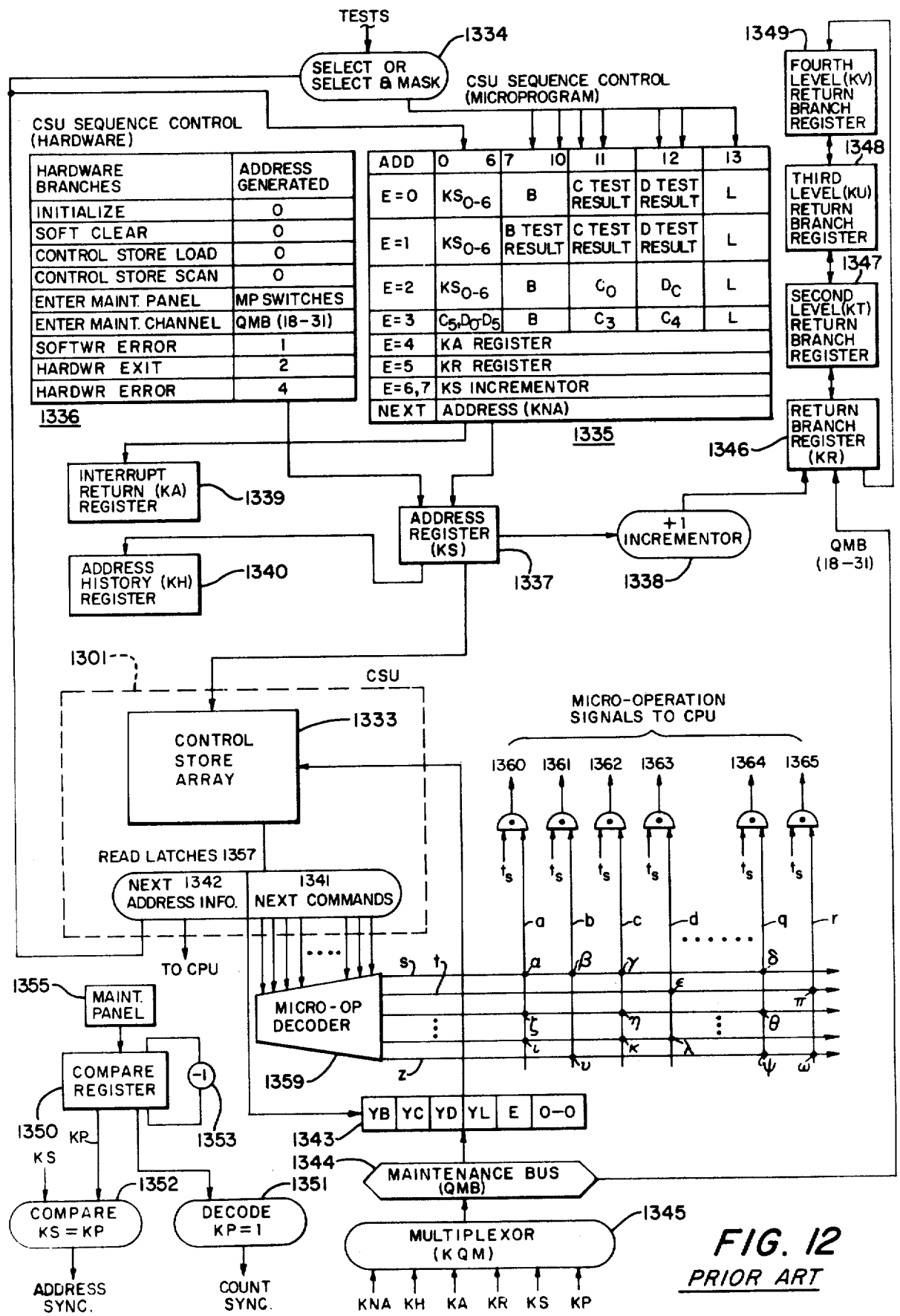

Referring to FIGS. 11 and 12 details of the control unit 1029 of FIG. 10 are shown. (See also U.S. Pat. No. 3,891,974 Issued June 24, 1975.) The control unit, although shown separate from the central processing unit (CPU), is in actuality a part of the CPU and is comprised of a control store unit CSU 1301, a control store interface adapter CIA 1302 and appurtenant subunits, control store loader CSL 1303 and control and load unit CLU 1304.

The control store unit CSU 1301 receives microinstructions from the control store loader CSL 1303 via the control and load unit CLU 1304 and the control store interface adapter CIA 1302. Under normal operating conditions, microprograms are loaded from an external source during system initialization and become a permanent control function of the machine. However, the control store unit CSU 1301 has the ability to be reloaded and initialized in a manner that provides for a variety of central processing unit CPU operational modes. The following modes of operation of the CPU are available under control of the CSU 1301: (a) native mode; (b) emulation mode; (c) concurrent native and emulation modes; (d) diagnostic mode. This capability is possible because the microinstructions resident in the CSU are the source of microoperations used to control the operation of all other CPU functional units such as the emulation unit 1316, the arithmetic logic unit 1317, the instruction fetch unit IFU 1318, the address control unit ACU 1319 and the data management unit DMU 1321. Also shown within the central processing unit CPU 1021 are general registers 1307, base registers 1308, scientific registers 1309, T-registers 1310, status registers 1311, instruction counter IC 1312, and hardware control mask register 1313.

Typically, the control store unit CSU 1301 is a 9K bipolar integrated circuit programmable read-only memory (PROM) mixed with read/write random access stored (RAM). It has a typical 150 nanosecond read cycle and a 450 nanosecond write cycle. Each location of control store stores one 84-bit microinstruction word (to be later more fully described), and each microinstruction word controls one CPU cycle. As each location of the control store unit CSU 1301 is read, its contents are decoded by micro-operation decoders which provide micro-operation control signals each of which causes a specific operation within the CPU to take place (to be later described in detail).

By grouping locations within each microinstruction word (to be later described in detail) control store sequences are obtained that can perform a specific CPU operation or instruction. As each instruction is initiated by the CPU, certain bits within the op-code are used to determine the control store starting sequence. Testing of certain flops (not shown) which are set or reset by instruction decode functions allows the control store memory to branch to a more specific sequence when necessary.

The control store interface adapter CIA 1302 communicates with the control store unit 1301, the data management unit DMU 1321, the address control unit ACU 1319, and the arithmetic logic unit ALU 1317 for directing the operation of the control store memory 1333 of FIG. 12. The CIA 1302 includes logic for control store address modification, testing, error checking, and hardware address generation. Hardware address generation is utilized generally for developing the starting address of error sequences or for the initialization sequence.

The data management unit DMU 1321 provides the interface between the CPu 1021 and the main memory and/or buffer store memory shown on FIG. 10. It is the responsibility of the data management unit to recognize which unit contains the information required by other units and strobe the information into the CPU registers at the proper time. The data management unit DMU also performs the masking during partial write operations.

The instruction fetch unit IFU 1318 interfaces with the DMU 1321, the ACU 1319, the ALU 1317, and the CSU 1301, and is responsible for keeping the CPU supplied with instructions. The instruction fetch unit has the next instruction available in its registers before the completion of the present instruction. To provide this capability, the instruction fetch unit IFU 1318 contains a 12-byte instruction register (not shown) that normally contains more than one instruction. In addition, the IFU, under control the the CSU, requests information (instructions) from main memory before the instruction is actually needed, thus keeping its 12-byte instruction register constantly updated. Instructions are thus prefetched by means of normally unused memory cycles. The instruction fetch unit also decodes each instruction and informs the other units of the instruction's length and format.

The address control unit ACU 1319 communicates with the IFU, ALU, DMU, and the CSU via the CIA. The ACU 1319 is responsible for all address development in the CPU. All operations of the ACU, including transfers to, from, and within the unit, are directed by CSU micro-operation and logic in the unit. The normal cycling of the ACU depends on the types of addresses in the instruction rather than on the type of the instruction. Depending on the address types, the ACU may perform different operations for each address in an instruction. The ACU also contains as associative memory 1319a that typically stores the base address of the 8 most recently used memory segments, along with their segment numbers. Each time a memory request is made, their segment number is checked against the associative memory contents to determine if the base address of the segment has already been developed and stored. If the base address is contained in the associative memory 1319a, this address is used in the absolute address development, and a considerable amount of time is saved. If the base address is not contained in the associative memory 1319a, it is developed by accessing the main memory tables. However, after the base address of the segment is developed, it is stored in the associative memory, along with the segment number, for future reference.

Interfacing with the ACU, IFU, DMU and the CSU is the arithmetic and logic unit ALU 1317. Its primary function is to perform the arithmetic operations and data manipulations required of the CPU. The operations of the arithmetic logic unit are completely dependent on micro-operation control signals from the control store unit CSU 1301.

Associated with the ALU 1317 and the CSU 1301 is the scratch pad memory unit LSU 1315, (sometimes referred to also as the local store unit). It is typically comprised of 256-location (32 bits per location) solid state memory and selection and read/write logic for that memory. The scratch pad memory 1315 is used to store CPU control information and maintainability information. In addition, the scratch pad memory 1315 contains working locations which are primarily used for temporary storage of operands and partial results during data manipulation. Also associated with the ALU 1317 is an auxiliary memory 1317a comprised typically of 64 flip-flops for storing miscellaneous states of the computer system.

The CPU also has a clocking unit 1320 and is essentially 2 clocking systems in 1: the first clocking system generates the timing for the control interface adapter CIA 1302 and the second clocking system generates the timing pulses for the operations of the functional unit within the central processing unit.

Figures 13, 14:
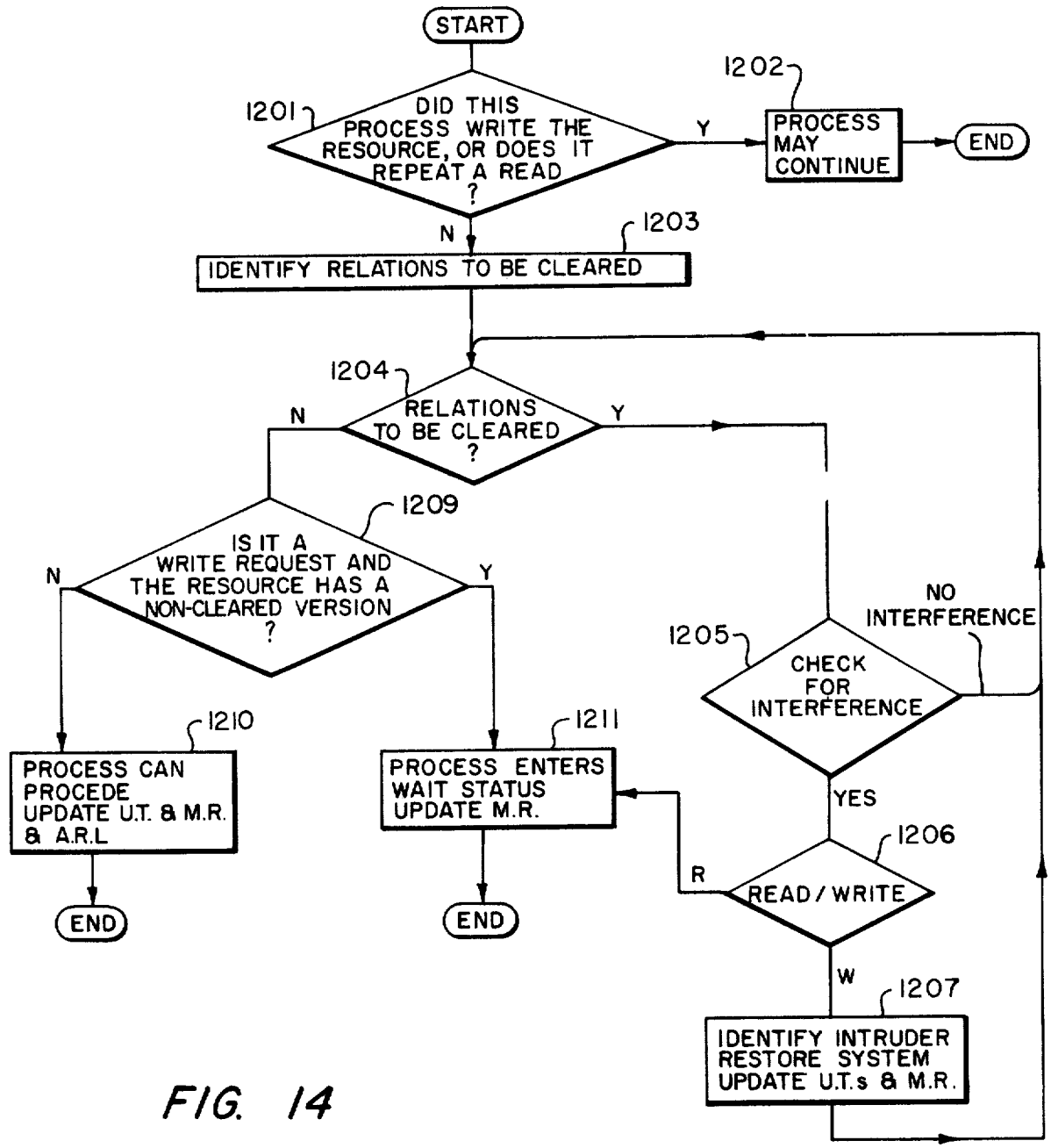

Referring now to FIG. 13, there is shown the format of the control store word 1325. The control store word is typically 84 bits wide and is divided into 6 main fields:
(a) sequence type field 1326 (3 bits);
(b) branching and/or micro-operations 1327 (23 bits);
(c) constant generation and designation 1328 (14 bits);
(d) data to bus 1329 (8 bits);
(e) micro-operations 1330 (32 bits); and
(f) checking 1331 (4 bits).

The 3 bit E field of the control store word 1325 is used as a sequence control field. There are typically 7 different sequence types and 1 reserved type. Referring to block 1335 of FIG. 12, when E field equals binary 0, 1 or 2, the branching field A, B, C, D and L of microinstruction 1325 of FIG. 13 is utilized to generate the next address.

The first 6 bits of KS register 1337 is utilized together with the B field, a C test results, the D test results and the L field to provide the next address of the next microinstruction which is then placed in address register KS 1337. When the E field is set to binary 4 (see block 1335) the next address selected is taken from interrupt return register KA 1339. The address stored in the KA registor is the one generated by the next address generation logic when the hardware interrupt occurs. When the E field is set to binary 5, a branch is used to initiate a subreturn from a microprogram subroutine. When used, the contents of the return register KR 1346 are used as the next control store address. The return register 1346 is loaded by issuing a control store command which will load present control store address in KS register 1337 plus 1, from incrementor 1338, into the KR register 1346. A one-level-nesting subroutine ability is provided via the KT return branch register 1347. Every time the KR register 1346 is loaded, the old contents of the KR register is transferred to the KT register 1347; every time the microprogram return is called, the contents of the KT register will transfer back to the KR register. Third level nesting subroutine ability is provided by the KU register 1341 and fourth level nesting subroutine ability is provided by the KV return branch register 1349. When the E field of the control store word is set to binary 6, the next control store word addressed is equal to the present address in KS register 1337 plus 1 in incrementor 1338. When the E field is set to binary 7, the CSU 1301 enters the diagnostic mode and the next address will be the present address plus 1.

In addition to the sequencing control of branching to the next control store address described above and shown in block 1335, there is hardware generated sequence control shown in block 1336 of FIG. 12. (Note: Blocks 1335 and 1336 are in actuality hardware registers drawn so as to depict the different forms that the microinstruction words may take). The hardware generated branches are overriding conditions (such as errors, initialize, control store scan, etc.) which suppress the E field and force a fixed address into the control store address register KS 1337. The branch is made by forcing an interrupt line high (not shown) for one clock period and storing the address which would have been generated under the control of the E field into the KA interrupt return register 1339. A hardware generated address will be placed into the control store address register. Certain hardware/firmware generated interrupts take priority when the interrupt-block flip-flop (not shown) which prevents additional interrupts in their class from being executed until the interrupting condition has been satisfied. A firmware micro-operation exists for controlling the resetting of the interrupt block flip-flop for those sequences which are under firmware control. Those sequences under hardware control automatically generate a reset of the flip-flop at the end of the sequence. The following conditions, listed by priority, exists in this category: (a) control store load; (b) control store scan; (c) hardware error; (d) software error. The remaining hardware conditions do not set the interrupt flip-flop but do cause an immediate action to occur when generated. The following conditions listed by priority, exist in this category:
(a) initialize;
(b) soft-clear;
(c) enter maintenance panel;
(d) enter maintenance channel;
(e) hardware exit.

An initialize signal causes the CSU 1301 to branch to address binary 0, clear hardware resettable errors and execute a control store load operation followed by a control store scan sequence under hardware control. It will also perform system initialize. A soft-clear signal causes the CSU 1301 to branch to address binary 0, clear hardware resettable errors and reset the interrupt block-flop. An enter maintenance panel signal causes the CSU to branch to the address preset in the CSU address switches on the maintenance panel (not shown).

An enter maintenance channel signal causes the CSU to branch to an address generated via the maintenance channel (not shown). The address loaded is from maintenance bus QMB 1344, which is part of the maintenance channel, and is right-justified. A hardware exit signal causes the CSU to branch to binary address 2. This sequence is used as a maintenance facility. At the end of the sequence a return in initiated by issuing an E field branch with the E field set to binary 4.

A control store load signal causes the CSU to branch to address binary 0. It also turns off the CSU read-cycle flop (not shown), the system clock 1320, and places the CSU in the load state. In the load state, the CSU can be loaded from the control store loader CSL 1303, the IOC 1305, the main memory 1011 of FIG. 10, or the system operator's panel 1030. When loaded from the CSL, an automatic scan is generated at the end of the load. When loaded from any other media, a scan may be issued by either generating a micro-operation signal or setting the scan switch on the maintenance panel. A control store scan signal causes the CSU to branch to address binary 0. A control store scan is under hardware control for the duration of the sequence. During the scan, the system clock 1320 is off and therefore no commands or tests are executed. At the end of the scan sequence the hardware transfers the contents of the interrupt return register KA to the address register KS, the system clock is turned on and control is returned to the firmware.

A hardware error signal causes the CSU to branch to address binary 4. In the normal processing mode, a hardware error detected in any CPU functional unit will activate a hardware error line (not shown). The control store sequence generated will test the system conditions to determine the action to be taken. In the diagnostic mode, error conditions which are hardware detectable are visible to micro-diagnostics. The micro-diagnostics control the action to be taken. A software error signal on the other hand causes the control store to branch to address binary 1. This address is the start of the software error reporting sequence which is under micro-program control.

Referring once again to FIG. 13, the E field 1326 is a 3-bit field for the branch code as previously described. The branching and/or micro-operation field 1327 is comprised of the A, B, C, D and L fields (also shown on block 1335 of FIG. 12) wherein the A field is the upper 6 bits of the next address, the B field is the middle 4 bits of next address of the mask field on 64-way branch, the C field is a 6-bit test field for 1 of 64 tests, the D field is another 6-bit test field for 1 of 64 tests, and the L field is the least significant bit. The K field 1328 is a 14-bit field. The data to bus field 1329 is comprised of the QA field having 4 bits for controlling information to the QA portion of the QMB bus 1344 and the QB field has 4 bits for controlling information to the QB portion of the QMB bus 1344. The F field 1330 is a 32-bit field which is coded to generate micro-operation subcommands. The P field 1331 is comprised of 4 bits reserved for checking.

In operation the microinstruction words are stored in the control store array 1333. During a cycle of operation, the control store array is addressed by the contents of the KS address register 1337. This causes the contents of the location specifed by the address to be read into the group of read latches 1357. Portions of the word contents of the read latches are distributed or transferred to storage registers within each of the functional units in the CPU. Each functional unit includes decoding logic circuits for generating the requisite subcommands specified by the control store word under control of the system clock source. In general, decoding is performed within each functional unit in the CPU rather than being performed centrally in order to minimize the decoding time and to reduce the number of cables which would be normally required for transmitting command signals if decoding were performed centrally. Additionally, the decoding is done within each unit to avoid timing problems arising from differences in cable delays. Further, by decoding subcommands with each unit, those signals which are representative of certain conditions existing within the functional unit and are required for the generation of certain subcommand signals do not have to be returned to the CIA unit 1302. A typical decoder unit 1359 is shown in FIG. 12 as receiving various fields from microinstruction words and generating microoperation signals $a, b, c, d, \ldots q, r$. A typical micro-operation decoder 1359 receives commands from a microinstruction word. The field from the microinstruction word is decoded and sets one of a plurality of lines $s, t, u, \ldots y, z$ high. A matrix is formed by having a second set of lines a to r coupled to the s-z lines at points $\alpha, \delta, \gamma \ldots \omega$. Typically, when the field from a microinstruction is decoded one of the lines s-z goes high. Since the black dots shown in the matrix by Greek letters $\alpha$ through $\omega$ represent impedance coupling between the two sets of lines, any electrical signal propagating along any horizontal wire will be coupled through and propagate along the vertical a-r where an impedance coupling (black dot) is indicated. Each vertical line a-r then may be coupled as one input to one each of AND gates 1360–1365. Other input signals may also be coupled to AND gates 1360–1365 including a timing signal $t_s$ from the central timing unit. Accordingly, as each timing signal $t_s$ goes high, those gates which have all the other input signals high will be enabled and will provide microinstruction signals to predetermined functional units in the CPU. For example, if a command 1341 from read latch 1357 is decoded and a horizontal line is high, the $a, b, c,$ and $q$ vertical control lines will be high and AND gates 1360, 1361, 1362, and 1364 will be enabled as the $t_s$ timing signal is applied to these gates. Hence, the combination in which the vertical control lines are coupled to the horizontal control line at different points represented by the Greek letters $\alpha$ through $\omega$, represent a permanent switching matrix for supplying micro-operation signals to the central processing unit CPU for controlling the functional units within the central processing unit by micro-instructions furnished from the control store array 1333. Thus, permanent firmware having an alterability feature can be built into the machine by merely specifying the sequence of micro-operations that is required as a capability of the computer system.

Under normal conditions, data is written into the control store array 1333 via the CPU write-data register also known as the local register 1343. A control flop (not shown) defines whether the upper half or lower half of the storage array is to be written. Data from the control and load unit CLU 1304 arrives at the CIA/CSU via the maintenance bus QMB 1344 and is buffered by the storage local register 1343 before being written into the control store array 1333. The storage local register 1343 is time shared as both a read and a write local register. The multiplexor KOM 1345 may be controlled by either the system operator's panel 1030 of FIG. 10 or by the micro-diagnostics and provides a read out path from the registers connected to it. A compare register KP 1350 is provided for non-functional use and is used mainly for maintenance purposes and is utilized along with compare logic 1352, decode logic 1351 and decrementor 1353.

A typical computer system as the one described above in connection with FIGS. 10, 11, 12, 13 is in general the environment in which the apparatus of the present invention operates. In these circumstances, the apparatus may utilize for its implementation, part of the previous organization and facilities. In particular, it may use the mechanism of the micro-operations. This mechanism can be summarized again as follows. The Control Store Array 1333 on the basis of KS supplied by the Address Register 1337 feeds the read latches 1357. This in turn, via the micro-operation decoder 1359, the matrix and the gates 1360 . . . 1365, indicates to CPU the micro-operation to be executed and at the same time, via 1342 and the CSU sequence controls 1335 and 1336, provides the address of the next microinstruction. Therefore, a person of ordinary skill in the art will be able to make and use the firmware/hardware implementations of the protection mechanisms disclosed by this invention, without undue experimentation, since he is provided with the block diagrams of the apparatuses and the corresponding explanatory tests as hereinafter described. Complex descriptions with matter within the knowledge of those skilled in the art are thus avoided. Even though FIGS. 10, 11, 12 and 13 describe in particular a specific Honeywell machine now commercially available, it is understood that other environments or products of the same or different companies such as IBM 370 may be utilized to practice the invention as well.

Moreover, the protection mechanisms, and the Family of instructions disclosed in the present invention may find their application in "non-computer" environments or in environments which do not provide the common facilities discussed supra. Therefore, a specific description of hardware embodiments to be used in these cases is provided to cover those instances (see in particular discussions and explanations added to FIGS. 17a, 17b, 20a and 20b).

The Protection Mechanism

The invention applies to the basic integrity mechanism of a system which performs the functions necessary to prevent failures and errors so that data are neither lost nor damaged. In particular, the protection mechanisms, described in the preferred embodiment of the invention, deal with the prevention of, or recovery from error caused by interferences among processes utilizing data and other information in a shared mode.

It can be described also as the monitoring apparatus that allows, or rejects, the accessing of the CPU 1021 (acting on behalf of some process) upon data elements, messages or equivalent pieces of information contained in the storage (buffer storage 1027 or a main memory 1011) or in peripheral or communication subsystems 1015, 1017, 1019.

The protection mechanism is called into action whenever a process has to access a resource (data or other pieces of information). In the preferred embodiments here described, the mechanism checks whether such an access causes interferences. If so, an appropriate restoring procedure is activated. Once the access has been legitimated, the mechanism checks whether there are some other causes to delay or refuse the access and proceeds accordingly.

As described earlier, the causes for the additional restrictions vary according to the specific mechanism and may have their rationale in a desire for a non-dependency among processes, a limitation in the space available for the storage of successive versions of the resources, etc.

In particular, the preferred embodiments of "No Dependency" guarantees that a process failure does not cause the failure of another as a consequence of data dependency. This method also limits to one the number of non-cleared version of a resource, which is also a very convenient feature.

To complete the operation, beside the actions outlined above, the mechanism also performs the operation of resuming the "waited" processes as soon as the causes for their suspensions are terminated.

The invention operates at any level of granularity of the resource.

The mechanism of protection will be described first for the No Dependency embodiment and then generalized.

THE NO DEPENDENCY MECHANISM

To describe the mechanism in the the present invention, two convenient elements of support are introduced: the Utilization Tables (U.T.) FIG. 9a and the Matrix of Relations (M.R.) FIG. 9b.

The Utilization Tables (see FIG. 9a) are one per utilized resource (or group of resources, whichever element is chosen as quantum of granularity* for interference protection). They list the non-cleared readers and writers of the resource.

(*) The size of the entity (resource) assumed as quantum of granularity can be freely chosen. For example: a field, a record, a page, a volume, etc.

These Tables or equivalent means are common tool for many control mechanisms.

The Matrix of Relations (one per system is sufficient) is a square matrix (see FIG. 9b) and has one row and one column per each non-cleared process.

Each element of the matrix indicates the relations existing between the process on the row and the process on the coumn ("process on the row" VERB "process on the column"). For instance:

symbol 1 indicates "process on the row follows but does not depend upon process on the column";

symbol 2 indicates "process on the row follows and depends upon process on the column";

symbol 3 indicates "process on the row waits for process on the column to be terminated and cleared"; etc.

symbol 0 indicates that process on the row has none of the previous relations with process on the column.

Obviously, the symbols are purely arbitrary and their meanings can vary from method to method. The above convention is the one in the present description.

The Matrix of Relations is typical of the interference methods based upon the present invention, but it must be emphasized that:

- it is not essential, since the relations can also be traced back from the U.T.s every time they are needed. Nevertheless the matrix is a rather powerful and simple tool, convenient to achieve high level of efficiency.

- it can be implemented also in a "non-matrix" form, as long as its substitute carries the same information. For instance, a graph as in FIG. 6b can carry the same information.

A third element of support for the mechanism is the list of resources affected by each process. These lists (Affected Resources Lists, A.R.L.), FIG. 9c are not peculiar of a mechanism of protection, but rather of any mechanism that wants to perform a selective recovery. In other words, if it becomes necessary to abort a process, the A.R.L. provides the list of the resources that have been affected by that process and therefore need restoration. (More in general A.R.L. may indicate other recovery actions, like the annulment of a message, etc.).

If instead the recovery is not selective, like for instance the case where it is based upon a generalized roll back of the system to a previous check point, these A.R.L. lists are not necessary.

We assume them here in order to describe the more sophisticated selective approach to our preferred embodiments.

To understand the dynamics of the content of these tables (U.T., M.R., A.R.L.) the following additional explanations are offered:

When a process (more precisely a process-phase, since, as noted in Section 10.1 of the General Discussion, all over the text the word process is used in this broad sense) is "born" (i.e. accepted as an actor in the system), it is given an identifier, or name, which we assume coincident with the number of the row (and column) assigned to it in the Matrix of Relations. This row and column in M.R. is initialized with zeroes.

The process is cancelled out of the matrix when it is terminated and cleared.

Every time the mechanism of protection discovers a relation among the processes, notes it on the M.R. With the No Dependency mechanism, the symbols, beside the zero, are 1 for a "follows but does not depend upon" and 3 for a "wait for". The symbol 3 overrides a preexisting 1 and 1 overrides the 0.

The Utilization Table of a resource is initially empty. When a process accesses the resource to read or create a new version of it, the name of the process is listed and the type of operation (read/write). A process that reads its own version is not indicated as reader (the previous indication as a write prevails). A process is listed only the first time it does a certain operation if it reads again or if it modifies again the same version of a resource it is not listed again. When a process is cleared (and it is erased from the matrix) it is also earased from the U.T.s. The size of the U.T.s. therefore does not increase continuously, but reaches a sort of dynamic equilibrium.

The A.R.L. of a process, initially empty, grows with the activity of the process and is erased when the process is cleared. Note, we here assume that these lists are used. But they are not essential. Their lack can be circumvented and will not affect the validity of the mechanism described hereafter nor their generality.

Referring now to FIG. 7 a preferred firmware embodiment of the No Dependency mechanism is described below.

START. The mechanism intervenes whenever there is a request to read or write on a resource.

Diamond 701. If the requesting process has already written the resource (i.e. it has already created a new version of the resource) or repeats a previous reading, the request is approved (exit to box 702 that authorize the process to continue), otherwise the operation continues with box 703. To perform this check, the mechanism reads from U.T. whether the process is already listed as the writer or repeats a read. Box 703. From U.T. of the requested resource the mechanism identifies which relations have to be cleared, if any.

To read:

(a) if there is not a non-cleared version of the resource, there is no relation to clear.

(b) if there is a non-cleared version, its writer must follow (without dependency) the requester. If such a time relation is not already on M.R.,(*) the relation is transmitted to the following step (diamond 704) for consideration.

(*) To this extent symbols 1 and 3 on M.R. are equivalent.

To write:

(a) if there is not a non-cleared version of the resource, the applicant writer must follow (without dependency) the readers of the resource, if any. The relations that do not already exist on M.R., are transmitted to the following step (diamond 704) for consideration.

(b) if there is a non-cleared version of the resource, the applicant writer must follow (and wait for) the writer of that version. If such a time relation(*) does not already exist on M.R., the relation is transmitted to the following step (diamond 704) for consideration. In this case, for reasons related to the restoring strategy, the identities of the readers of the cleared version are also transmitted, to be considered in case the relation with the writer fails the test.

(*) To this extent symbols 1 and 3 on M.R. are equivalent.

Diamond 704. If there are relations to clear, the mechanism proceeds to diamond 705, otherwise to step 709.

Diamond 705. This is the key step of the mechanism, the one where the new relations implied by the utilization of the resource are subjected to the basic test for interference. The test relies primarily on the use of one instruction (or set of instructions, if so implemented), DETECT FOLLOWERS, that is discussed later on in detail (THE FUNDAMENTAL CHECK FOR INTERFERENCE). The test determines which relations cannot be added to the M.R. because they contradict the already established set of precedences. If all relations are accepted, the mechanism goes to diamond 709, otherwise it takes note of the rejected relations and goes to 706.

In the particular case of a request to write on a resource with a non-cleared version, the acceptance is based on the relation between the requester and the previous writer. Note that if the relation is not acceptable, the mechanism goes as it must to diamond 706 but it tests in addition the relations with the readers.

Diamond 706. An interference caused by a request to read is avoided by rerouting the request to the non-cleared version: this implies a Wait for the process (box 711). If the interference is caused by a request to write, a restoring action is necessary and the next step is box 707.

Box 707. Any strategy is accepted which eliminates the interferences previously noted and restores the system. In the preferred embodiment the simplest rule for this strategy is the following:

If only one interference has been detected, the process ($p_j$) which appears as the second term in the rejected relation ($p_i$ follows ... $p_j$) is selected for abortion (i.e. it is considered the intruder).

If more than one interference has been detected, the requester itself is selected for abortion (i.e. it is considered the intruder).

Alternatively, if the application justifies it, the optimum candidacy for abortion is selected with one of the more sophisticated methods of Section 8 of the General Discussion. In particular:

The list of all processes which appear to interfere with the requester is made.

The abortion of each process in the list is selectively simulated on M.R. and a test is made to ascertain whether its elimination cures other interferences, beside the one for which it is in the list. This allows other processes to be eliminated from the list.

If the list is reduced to one process, this one is selected for abortion, otherwise the requester is the selected one.

In any case, the system is eventually restored utilizing the A.R.L.s. Then the U.T.s. and M.R. are updated accordingly.

Diamond 708. If the requesting process has not been aborted, the next step is the diamond 709.

Diamond 709. The interferences, if any, have been taken care of. The mechanism permits the process to proceed (Box 710) if a dependency is not created, i.e. if the request does not modify a resource which has already a non-cleared version. Otherwise, the process enters the wait status (Box 711).

Box 710. U.T., M.R. & A.R.L. are updated, then the process proceeds,

Box 711. M.R. is updated (symbol 3) and the process enters the wait status.

A variation of the above described embodiment for the No Dependency (FIG. 7) is shown by FIG. 14. If it is assumed that the requesting process cannot be selected for abortion, the basic difference between the two embodiments is that instead of performing the restoring actions all together as in FIG. 7 (Box 707) the embodiment of FIG. 14 identifies and eliminates the intruders one by one. While FIG. 7 leaves room for a restoring action based on a variety of "global strategies" (and the description of Diamond 707 above gives examples of such a strategy), FIG. 14 implies fewer alternatives but the implementation may be simpler.

Box 1201 to 1211 can be described as the corresponding boxes 701 ... 711, with an exception for 1205 and 1207.

Diamond 1205. One relation is checked for interference. If there is not interference, the mechanism branches to diamond 1204, chooses another relation to clear and so on until exhaustion. If the relation interferes, the mechanism branches to 1206.

Box 1207. For the identified interference the "intruder" is considered to be the process that appears as the second term in the rejected relation "$p_1$ follows $p_2$". (Simple rule described in Section 8 of the General Discussion. Incidentally, process $p_1$ in the present case is the requester itself). To restore the system to the status that would have existed if the intruder had never operated, the mechanism utilizes the A.R.L. of the intruder to identify the resources to restore and any other action to provide for.

U.T.S. and M.R. are updated to reflect the undue. Then the mechanism returns to diamond 1204.

NOTE: A procedure like the one of FIG. 14 is suitable for an environment which does not contemplate the possibility of aborting the requesting process.

Figure 15:
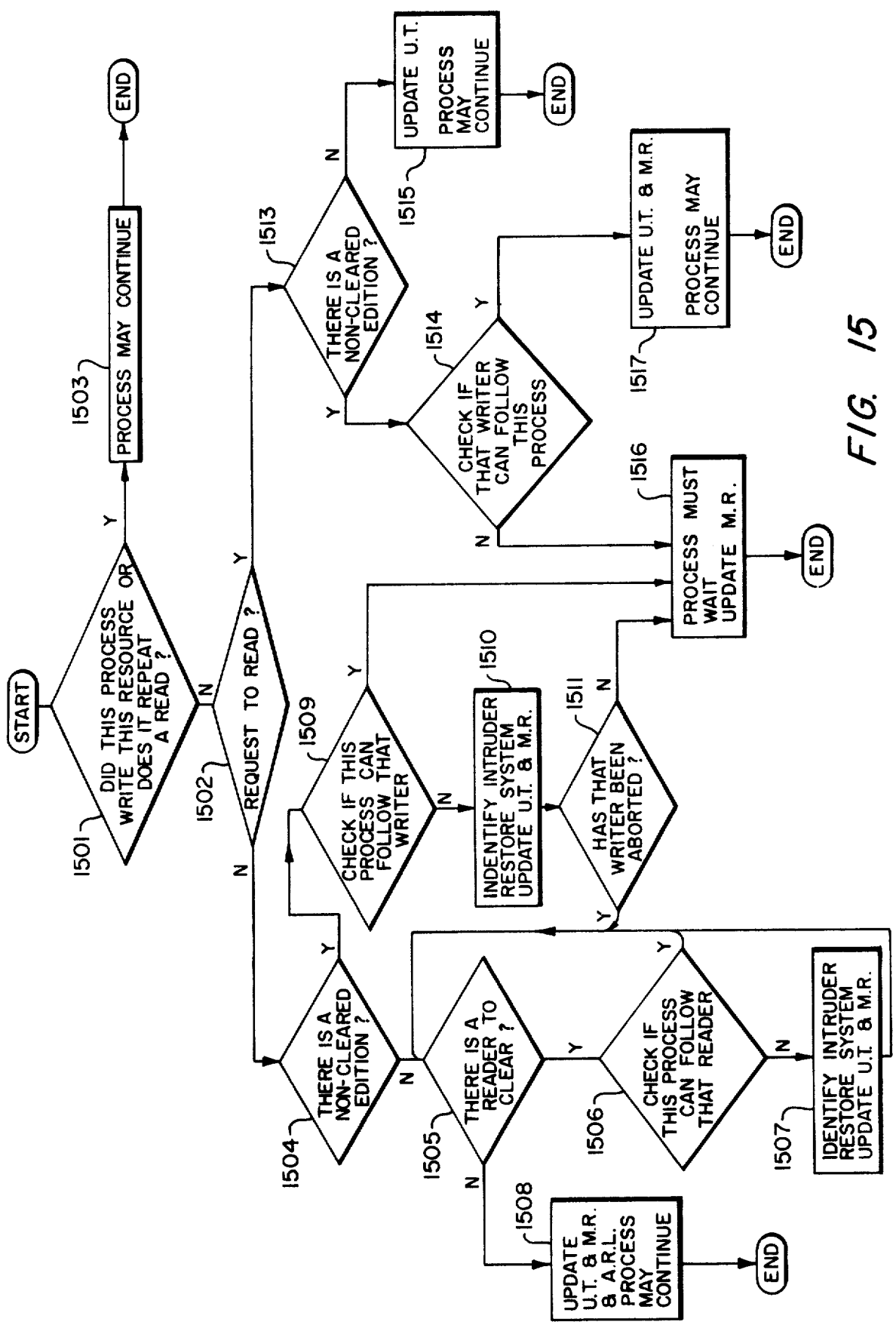
FIGS. 14 and 15 show variations of the "No Dependency" mechanism of the invention.

To conclude this section it is worthwhile to note that the variations according to the mechanism of "No Dependency" which may be implemented are not only of the type shown by FIGS. 7 and 14, where some functions are slightly different, but may be purely formal or instrumental. FIGS. 14 and 15 are an example of such a variation: the sequence of steps is rearranged but the functions are identical. The advantage of this variation is that is can provide a quicker execution even though the complete layout has more branches and appears more complex.

THE FUNDAMENTAL CHECK FOR INTERFERENCE

Referring once again to FIG. 7, Diamond 705 of FIG. 7 is based on an operation that we call DETECT FOLLOWERS. DETECT FOLLOWERS implements the fundamental check for interference, according to the concept discovered by the inventor.

The operation identifies from the Matrix of Relations M.R. all followers of a process, say $p_1$. Since diamond 705 in the No Dependency mechanism and the corresponding diamonds in the other mechanisms of the family presented by this invention are required to clear sets of relations like "$p_1$ follows $p_2$", "$p_1$ follows $p_3$", etc., the list of followers provided by DETECT FOLLOWERS indicates which relations are not acceptable.

Figure 16B:
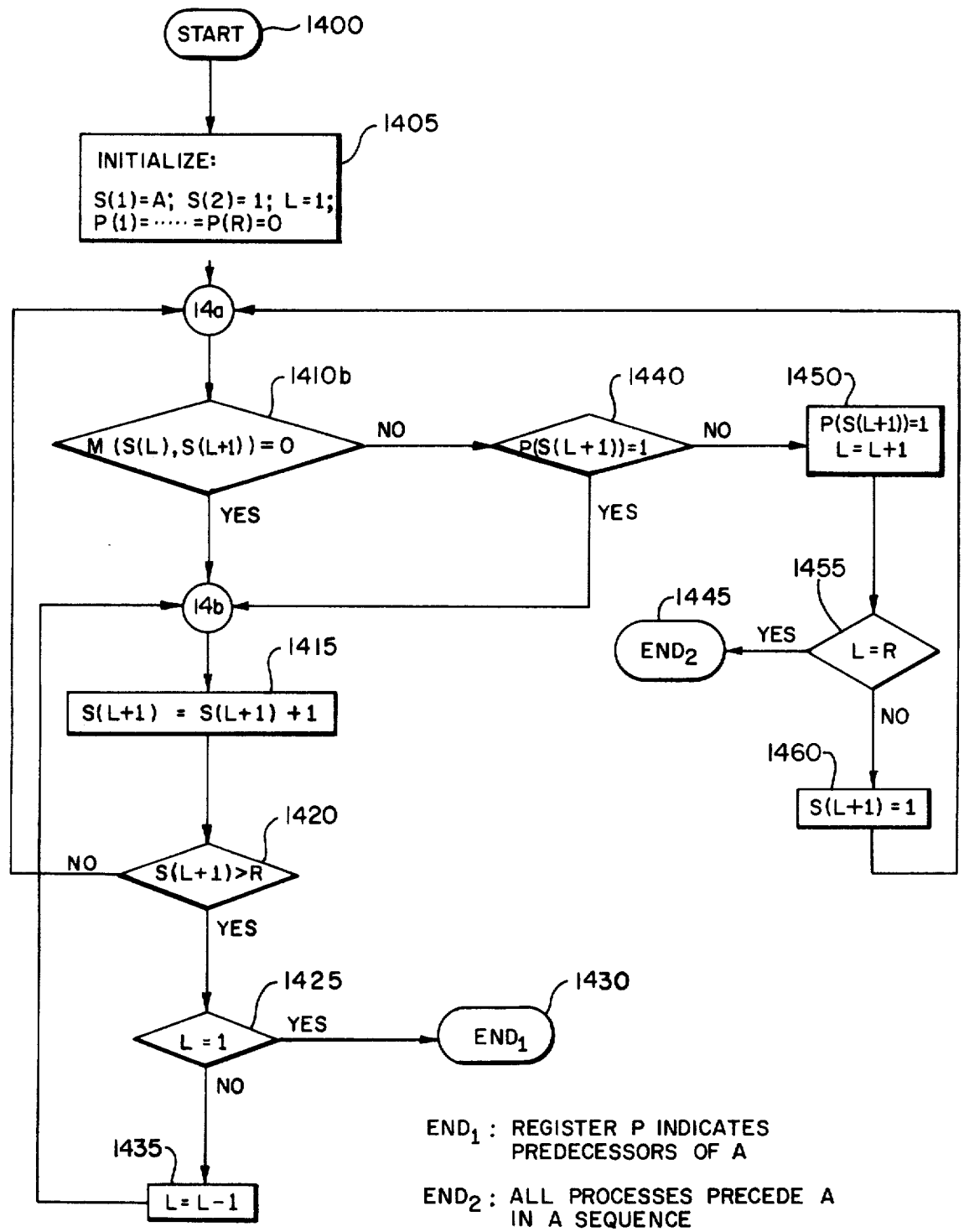
FIGS. 16a and 16b show two implementations of the basic DETECT FOLLOWERS and DETECT PREDECESSORS Functions of the invention.
Figure 16A:
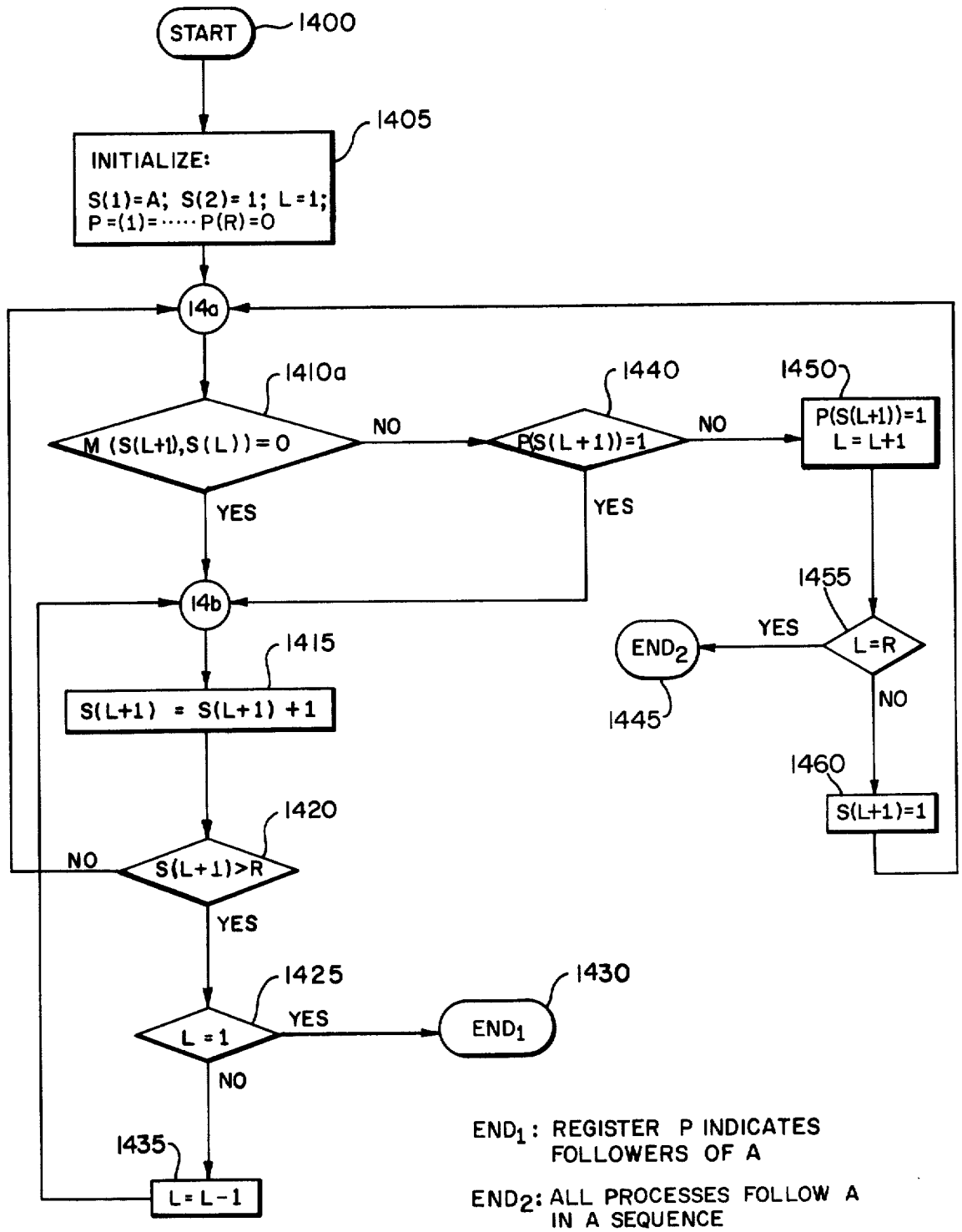

The preferred embodiment of the DETECT FOLLOWERS operation is one of the firmware and hardware embodiments shown in FIGS. 16a and 17a. However, it should be noted that software embodiments (as well as other firmware/hardware embodiments) are possible. A software embodiment in the form of PL1 program listings correspondent to FIG. 16 is disclosed in a next section: SOFTWARE EMBODIMENT OF DETECT FOLLOWERS.

FIG. 16a is now discussed as a Flowchart for the firmware or hardware embodiments of DETECT FOLLOWERS which will be presented in a next Section: Firmware and Hardware Embodiments of Detect Followers.

DESCRIPTION OF A FLOWCHART FOR FIRMWARE AND HARDWARE EMBODIMENTS OF DETECT FOLLOWERS

The logical background for the Flowchart has been presented by Section 10.1 of the General Discussion. (The No Dependency Mechanism — Detailed Description, in particular, at point 3 of page 27, of that Section).

FIG. 16a describes DETECT FOLLOWERS with reference to process A. $M(x, y)$ is an $R \times R$ matrix of relationships, capable of memorizing relationships for R processes. In the following description, the first or $x$ variable of the matrix is called the row and the second or $i/j$ variable is called the column. Let us assume that the names (Identifiers) of the processes are numbers and that these numbers correspond to the position (row and column) assigned to the process in this matrix. The identifier A is therefore a number. Let us assume also that the coefficients of the matrix have the conventional meanings discussed so far and in the above mentioned General Discussion; in particular, 0 means "no direct relation between the process in the row and the process in the column." For this embodiment it is sufficient to discriminate between zero and non-zero coefficients, because we here assume, as in the General Discussion, that all non-zero values indicate a "follow" relationship.

$S(I)$ is a vector of R elements ($i = 1, 2 \ldots R$) indicating a sequence of processes tested. L is a positive integer used as an index or counter for $S(i)$. $P(i)$ is a vector of R elements, used to memorize the processes that follow A when identified. In block 1405, S(1) and S(2) and L are set to their initial values A, 1 and 1 respectively, vector P is initialized with zeros. During this description, it is assumed that DETECT FOLLOWERS is being used in a context like diamond 705 of FIG. 7 to check the possibility of introducing in the matrix new relations "A follows...". The operation of diamond 705 may require to check one or more of these relations. DETECT FOLLOWERS provide the list of the followers of A, i.e. the list of the processes which cannot be accepted as second terms in the relations above.

Continuing with the description of FIG. 16a, the operation proceeds to circle 14a and to diamond 1410a. In diamond 1410a, one coefficient of the matrix is tested to see if it equals zero. The first coefficient examined is in the first row and in the column corresponding to the process under test, i.e. process A. If the coefficient does not equal zero, a relationship has been detected between process in the row and process in the column, indicated by S(L+1) and S(L) respectively, and the operation branches to diamond 1440. In diamond 1440 the components of vector P corresponding to position S(L+1), i.e. to process in the row, is tested to determine if it is equal to 1, that is, to determine if the process has already been identified as a follower of process A. If so, the operation branches to circle 14b not to repeat a sequence of operations already performed. If the test in diamond 1440 yields a NO, operation branches to block 1450 in which the component P(S(L+1)) is set to 1, then the L counter is incremented by one. Operation then branches to diamond 1455. If L equal R, the test ends at exit 1445. This is a peculiar case: all processes follow a sequence process A, vector S indicates the sequence and all components of vector P equal 1. The test therefore rejects all relations. If L is not equal to R, the operation branches to block 1460, where the new S(L+1) is initialized to 1 (process 1). Operation then branches to circle 14a. In this manner, the process which has been detected to follow A and which is now memorized by S(L), is tested in its turn to identify its followers. It should be noted that this looping in the searching mechanism is a consequence of the transitive property of the relations of precedence.

If the test in diamond 1410a yields a YES answer, then the operation branches to point 14b and to block 1415. Next entry, that is the next row in the same column, should now be tested to see if it yields a precedence relationship. Therefore, in block 1415, the value of the vector element for the row entry is incremented by one. In diamond 1420, the row entry is tested to see if it is greater than R. If so, a complete column has been examined and the operation branches to diamond 1425. In diamond 1425, a determination is made of whether L = 1. If it does, the column for which testing has been completed is A, and the operation branches to circle 1430. Circle 1430 is the usual exit from the DETECT FOLLOWERS operation: the components of vector P which are equal to one, identify which processes follow process A and, consequently, which relations "A follows . . ." must be rejected.

If the test in diamond 1425 is NO, then the operation branches to block 1435 in which L is decremented by one. Operation then branches to point 14b. In this manner, the checking of the previous column reinitiates at the row entry one further than previously tested. If the test in diamond 1420 yields NO, that is if the column has not een completely tested, the operation branches to point 14a and the next entry is tested (i.e. same column, next row).

Note that exit 1445 can be merged into exit 1430, if so desired. The separation preserves the additional information that all processes follow process A in one sequence, but exit 1445 is a very rare event.

Many variations of the flowchart of FIG. 16a can be described, which either lead to different implementation of the same function or provide other functions of the same family, as for instance a function which detects the predecessors instead of the followers, a function which tests the relations between pair of processes, etc. With the exception of DETECT PREDECESSORS, which is the subject of a following section, the discussion of these variations is omitted, being understood that the principles of the present invention can be applied or implemented in a variety of dissimilar modes, without departing from the true spirit and scope of the invention.

SOFTWARE EMBODIMENT OF DETECT FOLLOWERS

Alternative embodiments of the DETECT FOLLOWERS operation may be in the form of a computer program. The following is such a computer program implementing the invention utilizing a PL1 program listing.

$L=1$;
$S(1) = A$;
$S(2) = 1$;
do $X = 1$ to R;
$P(X) = 0$;
end;
14a: if $M(S(L+1), S(L)) = 0$, then go to 14b;
if $P(S(L+1)) = 1$, then go to 14b;
$P(S(L+1)) = 1$;
$L=L+1$;
if $L=R$, then go to 1445;
$S(L+1) = 1$;
go to 14a;
14b: $S(L+1) = S(L+1)+1$;
if $S(L+1)^{\wedge} > R$, then go to 14a;
if $L=1$, then go to 1430;
$L=L-1$;
go to 14b;

Obviously, 1430 and 1445 are labels for the two possible exits.

FIRMWARE AND HARDWARE EMBODIMENTS OF DETECT FOLLOWERS

The detailed operations taking place within a CPU are controlled to a significant extent by microprograms stored within a control unit. A control unit of this type has been described herein supra and in U.S. Pat. No. 3,634,883 issued on Jan. 11, 1972 to Leonard L. Kreidermacher, and a detailed general discussion of microprogramming control technique is presented in Microprogramming Principles and Practices by Samir S. Husson, Prentice Hall, Inc. (1970). As a consequence of that, since the present invention has its most frequent field of application in the Data Processing Systems, a complete description for its implementation is already provided by FIG. 16a itself and the corresponding FIG. 19a to be given later. A micro-operation technique, utilizing stored data and signals for conditional and unconditional branchings and for data transfers, implements the actions described for each diamond and box illustrated in the figures. These figures, with the corresponding explanatory texts, are at a sufficient level of detail to convey to the person of ordinary skill in control techniques, the information necessary to permit a firmware/hardware implementation of the various DETECT's functions they represent.

However, in order to cope with special cases where the usual facilities may not be available, FIG. 17a and, later on, FIG. 20a present a specific hardware implementation. To prevent undue burdening of the description with matter within the knowledge of those skilled in the art, a block diagram approach has generally been followed, with a functional description of each block and specific identification of circuitry it represents. The individual engineer is free to select elements and components such as flip-flop circuits, shift registers, etc., from his own background as from available standard references such as "Arithmetic Operations in Digital Computers" by R. K. Richards, (Van Nostrand Publishing Company), "Computer Design Fundamentals" by Chu (McGraw-Hill Book Company Inc.) and "Pulse, Digital and Switching Waveforms" by Millman and Taub (McGraw-Hill Book Company, Inc.). Moreover, most of the details that are well known in the art will be omitted from this description. For example, the transfer of information from one register to another is well known and is only generally indicated herein. Illustrations of single lines which may, in fact, represent plural lines for parallel transfers is well understood by those of ordinary skill in the art. Even though some details are eliminated, the basic description of the entire hardware system given in FIG. 17a will enable one skilled in the art to understand the complete embodiment of the invention.

FIG. 17a implements FIG. 16a and can be described as follows:

Let us first clarify the conventions adopted:

The symbols □ and ⊕ are for the AND and OR gates respectively.

As a rule, the capital letters like LE, indicate a variable of 1 bit, whereas the "quoted symbols", like "$Q_3$" indicate a multibit quantity (a byte or so).

As a rule, the single line indicates that the carried information is of 1 bit, whereas the double line indicates information of a byte or so.

Among the various symbols:

D represents the decoded output of the instruction.

$T_1$ and $T_2$ are the timing master signals for the System. In general, $T_1$ is used here to time the change in the count (step) indicated by the Sequencer Q, $T_2$ is used to time the function that has to be performed at each step.

The values that appear as inputs to the various gates, registers, etc., are either provided as outputs by some other gates, registers, etc., or are provided as "wired" values where necessary. The first case applies to symbols representing variables (like "Q", "L") the latter applies to symbols representing constants (like "1", "$Q_9$", "0").

We assume that processes are identified by numbers 1 to R, if R is the maximum number of processes the mechanism handles. The number indicates also the position of the process in the Matrix of Relations.

Let us now describe some components:

The sequence 1701a is a counter of 14 steps or any equivalent apparatus which provides 14 mutually exclusive statuses $Q_0, Q_1, \ldots Q_{13}$. Each step (or status or count) is identified by a corresponding (one bit) output signal $Q_0, \ldots Q_{13}$. (Note that $Q_0 \ldots Q_3 \ldots$ etc., are one bit signals indicating whether the sequencer is in these statuses, whereas "$Q_3$" $\ldots$ "$Q_9$" $\ldots$ etc., are multibit codes to command the sequencer to move into these statuses). The Sequencer Q has two inputs: one to increase the count by 1, the other to receive the value ("Q") to which to set the counter.

Register S 1702a memorizes up to R components of a vector S, each component being the identifier of a process (a number). "L" is utilized by the input/output logic as index:

outputs of register S are "S(L)" and "S(L+1)", input to register S is provided via "IS", and is entered as a new value for S(L+1). [Note: Timing in the input/output logic is so adjusted that when "IS" and a new "L" are provided at the same time, the memorization of "IS" is based on the new "L" (i.e. "IS" is stored into S(L+1) where L has the new value). This is the case of gates 1710 and 1711].

Register P 1702b has the capacity to memorize up to R components of a vector P, each component being of one bit. The Input/Output Logic of 1702b utilizes "S(L+1)" as index for the input SO and the outputs PO and PZ. Input SO (Set One) sets to 1 the indexed component of P. Output PO (P is One) indicates that the indexed component of P is set to 1, whereas output PZ (P is Zero) indicates that the indexed component is in the reset or zero condition. Input RA (Reset All) resets to 0 all components of P. Outputs $P_1$, $P_2$, provide, at the end, the answer of the operation: which processes follow process A.

To read the "Memory", where the Matrix of Relations is stored, the address is provided by the "Memory Address Identifier." It combines the inputs "X", "Y", "B", "R" into B + X × R + Y which is the address of the Y-th element in the X-th row of a R×R matrix whose base address is B. "B" and "R" are constants provided by corresponding registers, while "X" and "Y" are the variable indexes of the wanted element in the matrix. When the address, computed as above, is ready, the order RE (Read) is issued to the Memory 102.

The Memory is searched for the wanted element, then, when "MO" (Memory Output) is ready, this is indicated by DO (Done). (Note: DO signal (as RE above) lasts only for the time necessary for its utilization. For instance, it lasts a few time cycles or it is reset by $Q_5$).

Registers B, R, L, A, $CO_1$, $CO_2$, $F_1$, $F_2$ memorize corresponding values. The values B, R, L have been defined already; A is the identifier of the process in the basic question "which processes follow A?; $CO_1$, $CO_2$ and $F_1$ and $F_2$ memorize the inputs for the "Comparator" and the "Arithmetic Unit" respectively.

The "Comparator" 1701b answers EQ (equal) or NE (non equal) and GR (greater) or LE (less or equal) with reference to "$CO_1$" versus "$CO_2$".

The "Arithmetic Unit " 1701c adds (ADD) and substracts (SUB) the two inputs "$F_1$", "$F_2$". The elements of FIG. 17a implement the logic of FIG 16a. To illustrate this fundamental fact, we discuss hereafter FIG. 17a by showing the direct correspondence existing among boxes in FIG. 16a and counts (Q) and gates in FIG. 17a. (It may be helpful to note that the logic elements in FIG. 17a, part 1, are related to signal $D_1$ and therefore to the passages from one count (step) to the next; whereas the elements in FIG. 17a, part 2, are related to $D_2$ and to the operations performed by each step).

Initially the Sequencer 1701a is at step $Q_0$. Gates 1701 and 1702 allows $D_1$ to reach the Sequencer, increasing the count from $Q_0$ to $Q_1$. $Q_1 \cdot D_2$ [gate 1710] loads "0" into Register L via gate 1710a and provides "A" as input "IS" to the registers S via gate 1710b. As a consequence S(1) becomes = A. Meanwhile output RA of gate 1710 resets all components of registers P. Next, gates 1701 and 1702 allow $D_1$ to each the Sequencer 1701a, thus increasing the count to $Q_2$. $Q_2 \cdot D_2$ [gate 1711] loads "1" into register L via gate 1711a and as input IS; therefore S(2) become equal to 1.

The operations described so far, involving steps $Q_1$ and $Q_2$, imlement the operations indicated by box 1405 in FIG. 16a. $Q_2$ then opens OR gate 1701 which in turn opens, with $D_1$ being high, gate 1702 and increases the sequencer 1701a to step $Q_3$. $D_2 \cdot Q_3$ at gates 1712, 1712a and 1712b assign the values "S(L)" and "S(L+1)" to input "Y" and input "X" respectively of box 102a. On this basis, the Memory Address Identifier 102a computes the address of the element M(S(L+1), S(L)) and transmits it to the Memory 102 with the order to read (RE). Meanwhile the status changes from $Q_3$ to $Q_4$ (gates 1701-1702), and when Memory is ready (i.e. "MO" carries the wanted element and DO is "on"), $Q_4 \cdot DO$ at gate 1701 in combination with $D_1$ at 1702 increases the Sequencer to $Q_5$. These actions prepare for the branching described by diamonds 1410a and 1440 in FIG. 16a. In fact, $D_2 \cdot Q_5$ feeds the Comparator (gates 1713, 1713a and 1713b) and, if the result of the comparison is EQ (equal), or PO is "on" [i.e. [(S(L+1))=1], gate 1704, i.e. $D_1 \cdot Q_5 \cdot (EQ + PO)$ forces the next step to be $Q_9$, whereas, if the result is NE (non equal) and PZ is "on", gates 1701 and 1702 increase the Sequencer to step $Q_6$. This is the branching action described by 1410a and 1440 in FIG. 16a. Steps $Q_6$ and $Q_7$ correspond to diamond 1450 in FIG. 16a. In fact, $D_2 \cdot Q_6$ (gate 1714, 1714a and 1714b) feeds the Arithmetic Unit 1701c with "L" and "1" and provide the output put SO which sets to one the component P(S(L+1)) of register P. The operation then continues with step $Q_7$ (combination $Q_6$ at gate 1710 and $D_1$ at 1702). $D_2 \cdot Q_7$ (gates 1715, 1715a and 1715b) updates register L with the new value L+1 (from "ADD") and feeds the comparator with the same value and with "R". If the Comparator says NE (Non Equal), gates 1701 and 1702 increase then the count to $Q_8$, where gates 1716, and 1716a assign 1 as a new value to the component S(L+1) of register S. This update is described by box 1460 in FIG. 16a. As box 1460 is followed by operation 1410a, step $Q_8$ is followed by $Q_3$ as indicated by gates 1706 and 1706a. If the output of the Comparator at step $Q_7$ had been EQ (Equal), the operation would have reached exit 1445 via gate 1705 ($D_1 \cdot Q_7 \cdot EQ$) which provides the signal $END_2$ as a result of the operation [all processes follow process A]. If $Q_5$ had been followed by step $Q_9$ (as a result of $D_1 \cdot Q_5 \cdot (EQ + \lambda PO)$ at gate 1704), this and the next step ($Q_{10}$) carry the operation described by box 1415 in FIG. 16a. $Q_9 \cdot D_2$ (at gate 1717, 1717a and 1717b) feeds the Arithmetic Unit 1701c with "S(L+1)" and "1" then $Q_9$ and $D_1$ (gates 1701 and 1702) increase the Sequencer to $Q_{10}$. The combination $Q_{10} \cdot D_2$ supplies the new value "ADD" for S(L+1), via gates 1718 and 1718a. At the same time step $Q_{10}$ provides for next action (the branching described by 1420 in FIG. 16a) by supplying "S(L+1)" and "R" as input to Comparator (gates 1718, 1718a and 1718b). Branching is completed by gate 1707 (i.e. $D_1 \cdot Q_{10} \cdot LE$) and gate 1707a which forces $Q_3$ as new step or by gates 1701 and 1702 (i.e. $Q_{10} \cdot GR$ and $D_1$) which move the sequence to $Q_{11}$. Gate 1719 with $D_2 \cdot Q_{11}$ and gates 1719a and 1719b load "L" and "1" into the comparator, which in turn provides either EQ, which causes gate 1708 (i.e. $D_1 \cdot Q_{11} \cdot EQ$) to stop the operation with the answer $END_1$ (and all followers of A memorized by P), or NE, which causes gates 1701 and 1702 to move Sequencer to $Q_{12}$. The whole action corresponds to the one described by diamond 1425 in FIG. 16a. Step $Q_{12}$ and the successive $Q_{13}$ implement the operation of box 1435. In fact gate 1720 (i.e. $D_2 \cdot Q_{12}$) and gates 1720a and 1720b feed the Arithmetic Unit with "L" and "1", then step $Q_{13}$, created via gates 1701 and 1702, updates "L" with their difference ("SUB") at gates 1721 and 1702a. This action, which corresponds to box 1435 in FIG. 16a, is then followed by a jump to step $Q_9$, (via gate 1709 (i.e. $Q_{13} \cdot D_1$) and gate 1709a) which corresponds to operation in box 1415 as required.

In summary, the following parallelism can be established among the steps and the operations described by the flow diagram 16a and hardware diagram 17a parts 1 and 2: $Q_0 = 1400$; $Q_1$, $Q_2 = 1405$; $Q_3$, $Q_4$, $Q_5 - 1410a$; $Q_5 - 1440$; $Q_6$, $Q_7 - 1450$; $Q_7 - 1455$; $Q_8 - 1460$; $Q_9$, $Q_{10} - 1415$; $Q_{10} - 1420$; $Q_{11} - 1425$; $Q_{12}$, $Q_{13} - 1435$.

(Note, it is obvious that different embodiments of the same principle may consider the memorization of vectors P and other entities in the Memory itself rather than on separate registers. The variation implied on gates and the sequence of events are of minor order and may lead to some saving and possible slower operational time. We are not discussing them).

FIRMWARE AND HARDWARE EMBODIMENTS OF DETECT PREDECESSORS

DETECT PREDECESSORS is a function very similar to DETECT FOLLOWERS, with the only difference that it identifies the processes which precede a given process instead of those which follow it.

Depending upon the circumstances and the specific implementation, a mechanism of protection against interferences, built according to the rules disclosed in the General Discussion, may be better served by DETECT FOLLOWERS (as for FIG. 7) or by DETECT PREDECESSORS.

DETECT PREDECESSORS, as DETECT FOLLOWERS, may also find application in fields not directly concerned with the search for loops of interference. An example of such a case is provided in a following section (RESUMING THE WAITING PROCESSES)

The implementation of a DETECT PREDECESSORS function can be based on a very simple variation of DETECT FOLLOWERS: it is sufficient to explore the Matrix of Relations along the rows instead of the columns. This is accomplished by substituting M(S(L), S(L+1)) for M(S(L+1), S(L)) in diamond 1410a of FIG. 16a (and in the corresponding PL1 program listing given hereinabove) and in exchanging the input signals between the gates 1712a and 1712b in FIG. 17a part 2.

FIGS. 16b and 17b part 1 and part 2 present the software and hardware embodiments of DETECT PREDECESSORS which derive from this line of reasoning.

For their description the text used in connection with FIGS. 16a and 17a is perfectly adequate, once it is modified to reflect the exchange of roles between S(L+1) and S(L) in the exploration of the Matrix of Relations: diamond 1410a in FIG. 16a becomes diamond 1410b in FIGS. 16b, and gates 1712a and 1712b in FIG. 17a become gates 1712c and 1712d in FIG. 17b. The exchange causes the operation to reveal which processes precede, instead of follow, the process in S(1), i.e. process A.

RESUMING THE WAITING PROCESSES

FIGS. 7, 14 and 15 describe the main portion of the NO Dependency mechanism, but to have it complete it is necesary to describe also that part that resumes at due time, the processes in a WAIT status.

When a process enters the WAIT status, a symbol 3 is recorded in M.R. at the intersection between the row corresponding to the waiting process and the column corresponding to the process that caused the wait. The process shall resume its activity when the other is terminated and cleared.

This action can be so described:

all processes having a 3 in the column of the cleared process will be released one at a time;

each process is submitted again to the general test (FIGS. 7, or 14 for example) for the access being allowed;

U.T.s., M.R. and A.R.L.s. are updated accordingly.

Figure 18:
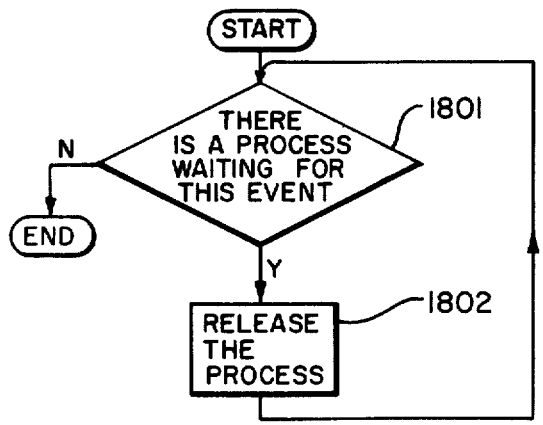
FIGS. 18 and 18a show a preferred embodiment of the releasing mechanism of the invention.

The simplest implementation of this mechanism is described by FIG. 18.

START. It corresponds to the event "a process has been cleared".

Diamond 1801. It tests whether at least one process is waiting for the event. If none, no further action is taken. If at least one is waiting, it enters Box 1802.

Box 1802. The selected process is released. This means that the process is submitted to the general test (FIG. 7 or equivalent). As a result, the process may resume its activity, enter another wait or be aborted depending upon the circumstances.

Exit of this Box goes back to Diamond 1801.

For those systems where it is likely that many processes are waiting for the same event, it is wise to release the processes in a sequence that reduces the probability of creating interferences. Such a sequence is any one in agreement with the existing time relations among the processes.

Figure 18A:
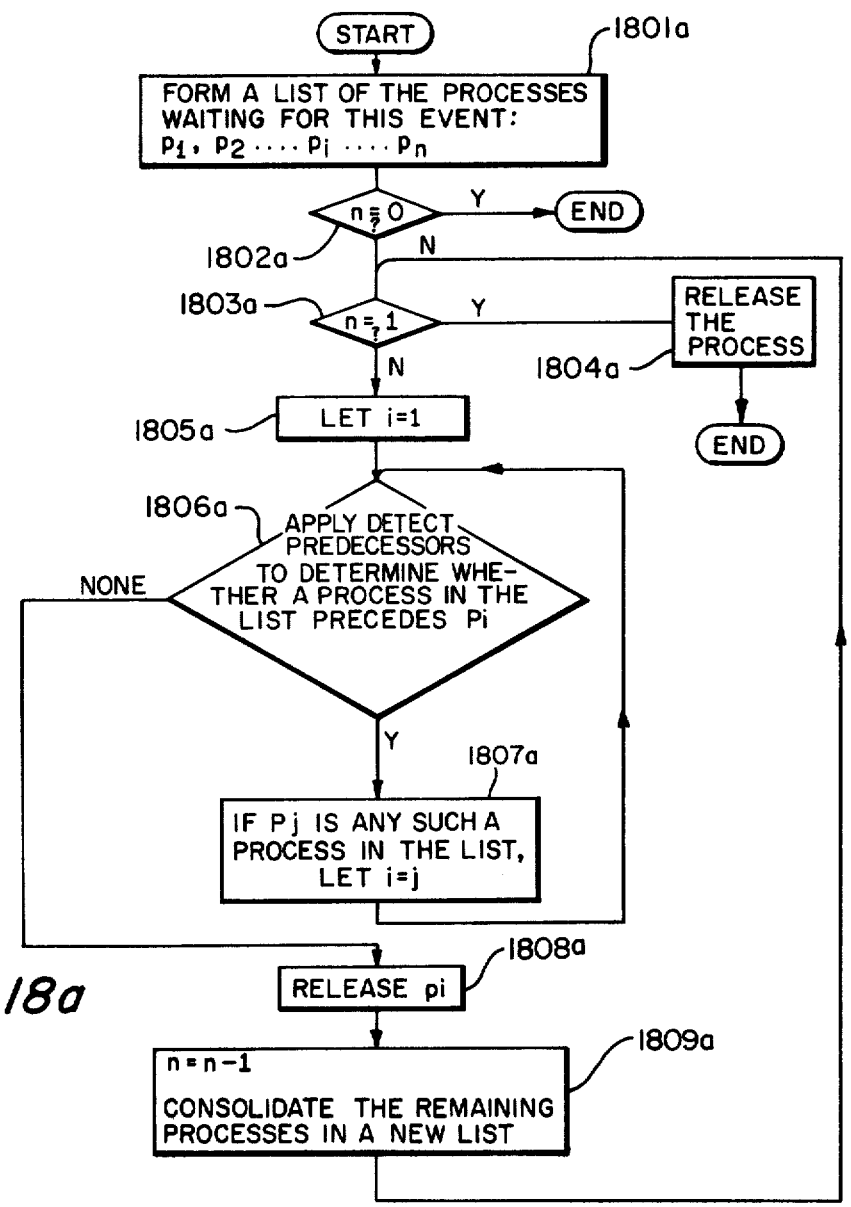

A preferred embodiment of this philosophy is shown in FIG. 18a.

Once the processes to be released are arranged in an arbitrary list $P_1, P_2, \ldots P_p \ldots P_n$ (Box 1801a), if the list is not empty (Diamond 1802a) nor contains just one process to release (Diamond 1803a) a pointer $i$ is initially set to 1 (Box 1805a).

The function DETECT PREDECESSORS is now applied (Diamond 1806a). It is important to note that the function is exactly the one described in the previous Sections to check the insurgence of an interference or a deadlock. Here instead it sequences the releases in a way not in contrast with the existing relations, to minimize the risk of subsequent interferences.

(This case is an example of possible use of the claimed functions in a context different from the original search for interferences).

If DETECT PREDECESSORS reveals that at least one process in the list of Box 1801a precedes $P_i$, the operation branches to box 1807a. Let $P_j$ be such a process. Box 1807a updates the pointer substituting $j$ for $i$, then the operation repeats test 1806a for the new $p$.

If DETECT PREDECESSORS reveals that none of the processes in the list precedes $P_i$, $P_i$ is released (Box 1808a) and the remaining processes are consolidated in a new list (Box 1809a), that will be submitted to the very same releasing procedure, from 1803a on.

One by one all processes are released. As pointed out in connection with Box 1802 of FIG. 18, to release a process means that the process enters again the general test (FIG. 7 or equivalent one) which caused its waiting status and which now determines its future course once more.

Note: the mechanism described by FIGS. 18 and 18a is by no means confined to the No Dependency method. It is an absolute general mechanism for the release of waiting processes no matter what cause generated the wait. Therefore, the problem of resuming the waiting processes will not be discussed again in the following sections that deal with the generalization of the protection mechanisms. Simply, it will be assumed that this mechanism is adopted.

THE GENERAL MECHANISM OF PROTECTION

As stated at Section 11 of the General Discussion the No Dependency mechanism is a special case of the general mechanism. In particular, FIG. 8 is the generalization of FIG. 7.

Let's describe this aspect with some details.

FIG. 8 is hereafter described with references to FIG. 7: the differences between the two figures are discussed.

Diamond 801. When the requesting process wants to read its own version of the resource, Diamond 801 authorizes it immediately (branching to Box 802). Diamond 707 of FIG. 7 can also authorize a rewrite because in the No Dependency mechanism no other process could have read that version. Both, Diamond 801 and 701 authorize the repetition of a previous read.

Box 803. This box is utilized initially and every time the request is rerouted. Assuming that the request is originally addressed to the last version of the resource and rerouted back one version at a time, the relations to clear are:

to read: the applicant must follow the writer of the addressed version of the resource.

to write: the applicant must follow the readers and the writer of the addressed version of the resource.

Box 703 of FIG. 7 operates differently because of the special rules of the No Dependency: (a) only two versions at most; (b) read initially addressed to the cleared version; (c) write addressed to the last version. This makes it convenient to obtain from Box 703 all information possibly needed with just one access to it.

Diamond 805. Interferences are detected with the DETECT FOLLOWERS operations, as in the case of Diamond 705 of FIG. 7. Exit NONE of Diamond 805 branches to Diamond 812 because interferences could have been detected during previous passages through Diamond 805 and noted by Box 813. Instead, Diamond 705 branches directly to Diamond 709 in FIG. 7, because it can be accessed only once.

Diamond 806. When a request to read is rejected, it is rerouted to the previous version of the resource. (It is assumed that the version is accessible). No restorations are implied: the mechanism branches to Box 815 which notes this fact and continues to Diamond 803. When a request to write is rejected, the interferences are noted by Box 813, then a branching decision is made by Diamond 814.

Diamond 814. If the writer of the requested version interferes with the applicant, the request is rerouted to the previous version (Box 815) to test whether that version is a viable solution. If, instead, the interferences are confined among the readers, rerouting is not an issue and Box 807 is immediately accessed. Not that when a request to write is rerouted by Box 815, no restoring action is taken at the moment, the main purpose being to collect information for Box 807 on the extension (or depth) of the interferences in order to decide on the best course of action. If Box 807 decides to abort the previous writer, rerouting will actually take place, but the interference can also be cured in a different way (e.g. by abortion of the requester itself). In any case, a restoration is made. In the No Dependency case, Diamond 706 of FIG. 7 branches directly to Boxes 707 or 711 because the alternatives are limited and further explorations are not necessary.

Diamond 807. As Diamond 707 in FIG. 7, Diamond 807 identifies the best restoring action, then actuates it. In both cases the rules are those described in Section 8 of the General Discussion, but in the No Dependency case the absence of dependent processes allows further simplification. For the general mechanism the preferred embodiment is the following:

two candidacies are considered. The first candidacy includes the requesting process and the processes which depend upon it.

The second candidacy is the list of all processes for which the precedence relations with the requesting process have been rejected, plus all processes which depend upon them.

If the first candidacy includes fewer process than the second, the requesting process and its dependents are aborted, otherwise the processes in the list are aborted.

Refinements of this rule include a minimization of the list (as described in Section 8 of the General Discussion), and a comparison of the candidacies based upon the weights rather than upon the number of processes.

Diamond 809. The Algorithm, which derives from the restrictions that characterize the specifics of the mechanism, is applied to identify the exit. (In FIG. 7 the rule was spelled out explicitly).

It is probably redundant to stress out that, as for the No Dependency, the general mechanism can be implemented with many variations, beside FIG. 8. The common element is in any case the fact that:

The request for the utiliziation of a resource is approved by a check that applies rules in agreement with the principle discovered by the inventor.

Violation of the rule can redirect the request or cause an action of recovery, depending upon the circumstances.

The operation having been cleared, other alogrithms and criteria can decide whether the access is allowed.

In any case the new status is recorded so that the mechanism operates on updated information.

In a sense it can be said that the additional restrictions are the main element that characterizes the various subclasses of this mechanism. A special case is the "Free Ride", where additional restrictions are not imposed. Another case is the No Dependency. Similar to this is the "One Non-Cleared Version". It differs from the No Dependency insofar as it allows reading the non-cleared version (therefore creating a dependency). Waiting is only caused by a request to write a second non-cleared version of a resource. A trivial extension is the "n versions" (per resource) where the waiting is imposed if the number of versions of a resource reaches a certain value n. Another case is the "limited space for temporary storage", where the system allows the creation of non-cleared versions of the resources until the area reserved for temporary storage is filled up.

The list of subclasses is far from being exhausted by these few examples.

As a final note, it may be worthwhile to repeat the observation previously made that in general the addition requirements call for the possibility of a Wait status, but that this is by no means an absolute rule since all consequences can be considered in the very general case. All these consequences (delays, rejections, etc.) are implied in the present description even though they are not explicitly mentioned.

THE GENERALIZED DETECT

The discussion in the previous section describes the general mechanism of protection. Yet another important aspect of the generalization deserves a detailed presentation and discussion: the generalized DETECT function or instruction and its related tools.

Let us consider some examples.

The Free Ride mechanism allows two types of relations: "follows but does not depend" (symbol 1 in the preferred embodiment of it) and "follows and depends" (symbol 2). From the pure interference point of view there is no need for a distinction between the two symbols, but the distinction is appreciated by the restoring portion of the mechanism (secondary aborts). [The procedure to identify dependents may use this generalized DETECT if it discriminates symbol 2 from the other symbols].

Analogously, the No Dependency mechanism uses "follows but does not depend (symbol 1)" and "waits" (symbol 3). Again, for the interference check both symbols are considered, whereas symbol 3 is the key to resume the waiting process.

When both dependency and wait are assumed, as in the general case, at least 3 symbols, beside zero, are to be considered. Again, for the check for interference the distinction may not be necessary (because it only matters whether the symbol is equal to zero or not) but it may be important for other portions of the mechanism, as for restoring, resuming and the like.

As a matter of fact, more than 3 symbols can be convenient to characterize the relations among the processes in the general case. As an example, the "wait" may deserve 3 symbols of its own, like "follows, depends and now waits", "follows without dependency and now waits", and "did not follow, but now waits".

Any subclass of the general mchanism utilizes a convenient subset of symbols, large in some cases and small in others.

Similar considerations can obviously be extended to the personalizations of the U.T.s. or A.R.L.s., but we will not insist on those.

In all the implementations discussed so far, it has been shown a check for interference sensitive to any non-zero symbol in M.R., rather than to some selected symbols. This is not always desired; if a symbol does not imply a precedence relation, it must be ignored by the check.

Since the general mechanism can utilize the matrix to carry other information beside the precedence relations, the generalization of the check for interference requires that a DETECT be implemented with the capability of discriminating among symbols, in order to cope with the peculiarities of all possible variations of the mechanism.

Therefore, for the implementation of a general mechanism, two basic forms of DETECT functions or instructions are here claimed:

DETECT FOLLOWERS or DETECT PREDECESSORS of process A with no indication of M.R. symbols, meaning DETECT on all non-zero symbols.

DETECT (p, q, . . . ) FOLLOWERS or DETECT (p, q, . . . ) PREDECESSORS of process A where p, q, . . . are the selected symbols to which the operation has to be sensitive.

The first category corresponds to the one utilized so far and whose firmware and hardware preferred embodiments have been described in relation with FIGS. 16a, 16b, 17a and 17b.

The second category allows the specification of selected symbols to which the function has to be sensitive in performing the operation.

For these functions or instructions we present the firmware hardware embodiments of FIGS. 19a, 19b, 20a and 20b. Their description (see next section) is perfectly analogous to the one given for the corresponding FIGS. 16a, 16b, 17a and 17b with the following difference: the test that DETECT FOLLOWERS (or PREDECESSORS) bases upon the fact that a retrieved symbol is "equal to zero", is based instead by DETECT (p, q, . . . ) FOLLOWERS (or PREDECESSORS) upon the fact that the symbol "is not p, nor q, nor . . . ".

The generalization has been introduced at the beginning of this section as a requirement for some implementations of the general mechanism against interference.

The usefulness of such a generalization is even more evident when the DETECT function is utilized outside the main area of the check for interference.

In any case, it is rather obvious that in order to permit the full exploitation of an instruction like DETECT, (in a protection mechanism or not) the capability of discriminating among symbols is essential.

The extension of the family of the DETECT instructions (or functions) can be sought also in another direction: the association, to the original DETECT, of additional functionalities. These associations can be very instrumental for the implementation of fast mechanisms. In particular, DETECT can be merged with functions performed by adjacent boxes in the operational diagram of the mechanisms.

Although the next Section describes embodiments for only one direction of the above mentioned generalizations, the other extensions can be obtained with similar adaptations from the embodiments of FIGS. 16a, 16b, 17a, 17b, 19a, 19b, 20a, and 20b and they will not be explicitly discussed hereafter.

Whichever the additional characteristics, all extensions belong to the DETECT family of instructions or functions, which utilizes and operates on the relationships among processes in a manner and/or with purposes which are peculiar of the present inventions.

THE IMPLEMENTATION OF THE GENERALIZED DETECT

We here limit the discussion to a fundamental pair of embodiments which generalize the ones described in connection with FIGS. 16a, 16b, 17a and 17b.

Figure 19A:
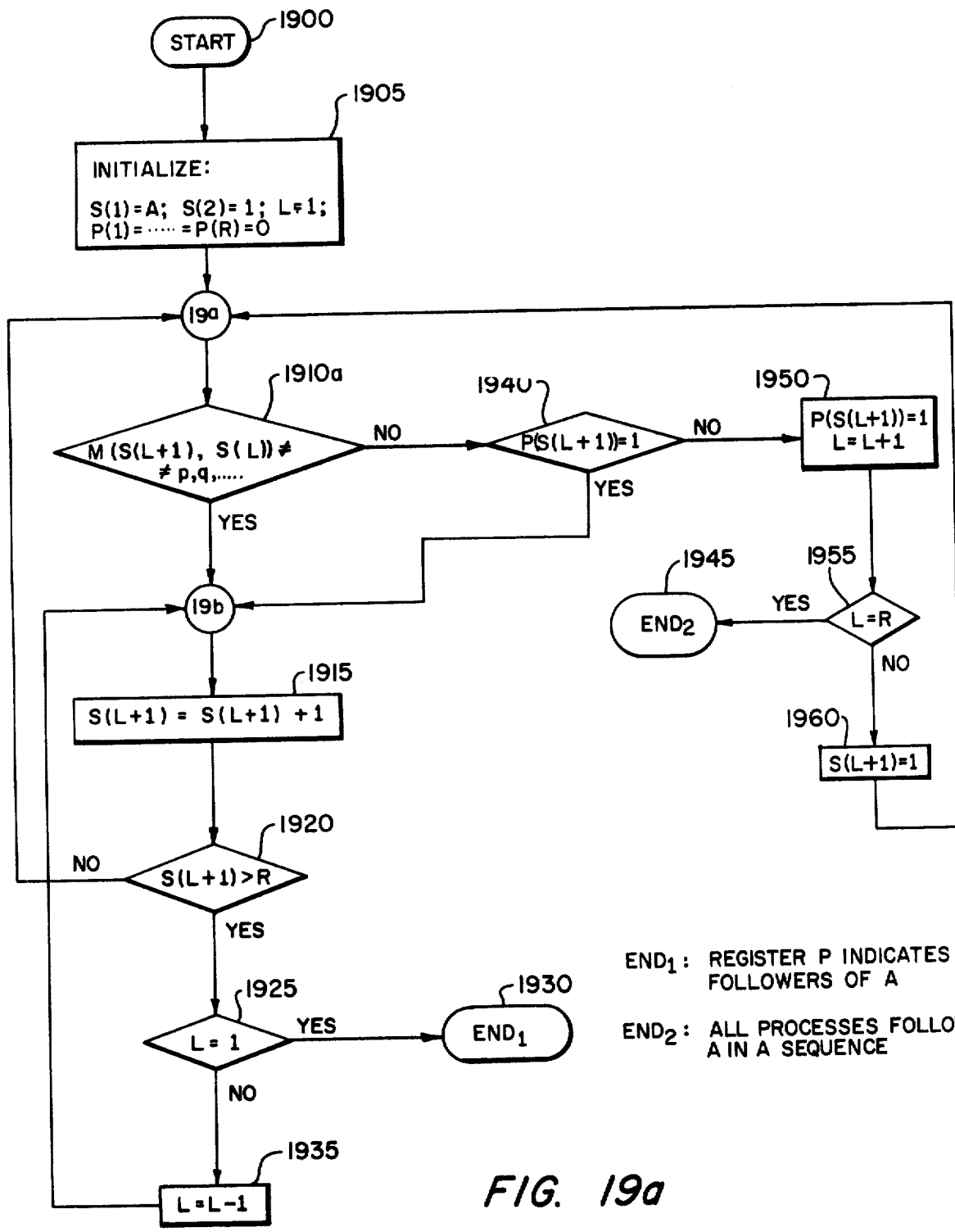
FIGS. 19a and 19b show two implementations of the DETECT $(p, q, \ldots)$ FOLLOWERS and DETECT $(p, q, \ldots)$ PREDECESSORS functions of the invention.

FIGS. 19a and b present the basic embodiments of DETECT $(p, q, \ldots)$ FOLLOWERS and DETECT $(p, q, \ldots)$ PREDECESSORS, where $p, q, \ldots$ are the symbols to which the operation has to be sensitive.

Obviously, an even more important input is the identifier of the process (A) on which the search is based. For simplicity, the text carries the above expressions without an explicit indication of it.

The same description used for FIGS. 16a and b can be used for FIGS. 19a and b. The only difference is in Diamonds 1910a and b respectively which compare the retrieved symbol with $p, q, \ldots$, declared by the instructions, and branch to 1940 if the symbol is equal to one of them, whereas address to 1915 if the symbol is different from them all. This is obviously a generalization of the comparison of the symbol with 0, done at 1410a and 1410b.

The PL1 program listings are also easily transformed accordingly.

The following is a PL1 program listing for the operation corresponding to the embodiment shown in FIGS. 19a:

$L=1$;
$S(1)=A$;
$S(2)=1$;
do $X=1$ to R;
$P(X)=0$;
end;
19a: if $M(S(L+1), S(L)) = p$, then go to 1940;
if $M(S(L+1), S(L)) = q$, then go to 1940;
. . .
19b: $S(L+1) = S(L+1)+1$;
if $S(L+1)^\wedge > R$, then go to 19a;
if $L=1$, then go to 1930;
$L=L-1$;
go to 19b;
1940: if $P(S(L+1)) = 1$, then go to 19b;
$P(S(L+1)) = 1$;
$L=L+1$;
if $L=R$, then go to 1945;
$S(L+1)=1$;
go to 19a;
where the conditional statements "if $M(S(L+1), S(L)) = \ldots$" are as many as the symbols to check for.

Figure 19B:
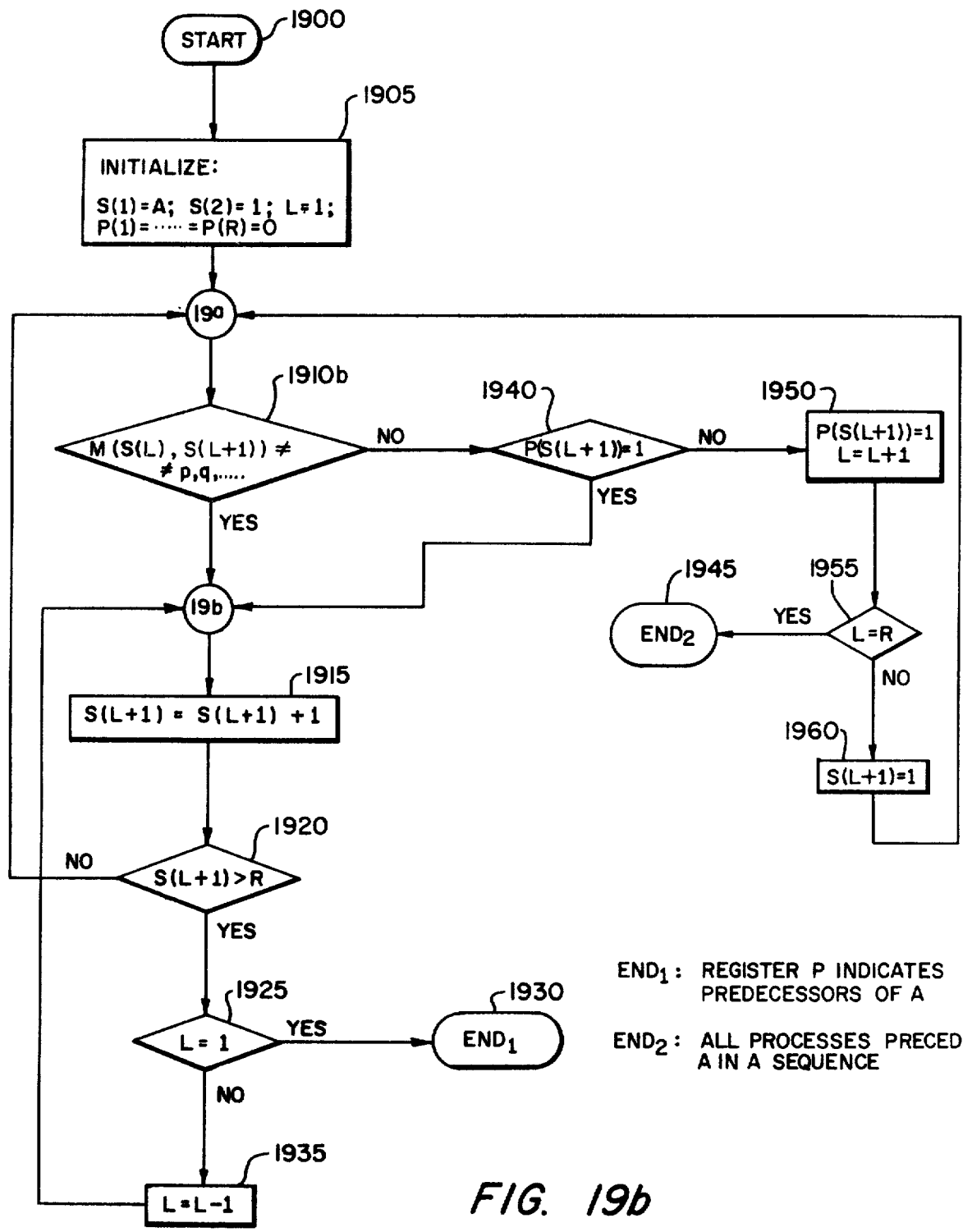

The following is a PL1 program listing for DETECT $(p, q, \ldots)$ PREDECESSORS according to the embodiments shown in FIG. 19b:

$L=1$;
$S(1)=A$;
$S(2)=1$;
do $X=1$ to R;
$P(X)=0$;
end;
19a: if $M(S(L), S(L+1)) = p$, then go to 1940;
if $M(S(L), S(L+1)) = q$, then go to 1940;
. . .
19b: $S(L+1) = S(L+1)+1$;
if $S(L+1) >^\wedge R$, then go to 19a;
if $L=1$, then go to 1930;
$L=L-1$;
go to 19b;
1940: if $P(S(L+1)) = 1$, then go to 19b;
$P(S(L+1))=1$;
$L=L+1$;
if $L=R$, then go to 1945;
$S(L+1)=1$;
go to 19a;

The conditional statements "if $M(S(L), S(L+1)) = \ldots$" are as many as the symbols to check for. In this and the preceding program, 1930 and 1945 are labels for the two corresponding exits $END_1$ and $END_2$.

The same line of reasoning that was used in connection with FIGS. 16a and b can be used here to state that FIGS. 19a and b are sufficient to permit a firmware/hardware implementation of the functions to the person of ordinary skill in the control techniques for Data Processing Systems.

In order to cope with special cases where the usual facilities may not be available and to ease the independent implementation of the function in other areas of application, FIGS. 20a and b are provided as a specific hardware implementation. To prevent undue burdening of the description with matter within the knowledge of those skilled in the art, the level of detail is the same used for FIGS. 17a and b and the individual engineer is free to select elements and components from his own background. The details are sufficient to those in the art to understand and implement the invention.

To illustrate FIGS. 20a and b, the same notes and observations provided in connection with FIGS. 17a and b can be used, with the following additional notes:

A multicomparator 2002d is provided. It owns a set of registers which are loaded with the values "p", "q", ... by the same mechanism that decodes the instruction (i.e. DETECT $(p, 1, \ldots)$ FOLLOWERS or PREDECESSORS) at the beginning of the operation. The multicomparator has one input "MC" which is compared with "p", "q", etc. The multicomparator has two outputs (of one bit only) MD (i.e. Multicomparison indicates Different) or ME (i.e. Multicomparison indicates Equal). When "MC" is different from all elements of comparison, MD is "set" by the multicomparator and ME is "reset"; when instead "MC" is equal to one of the elements, ME is "set" and MD is "reset". (*)

(*) In other words a Multicomparator is a combination of simple comparators. The answer MD (i.e. "different") is the AND of all the single answers "Different" whereas ME (i.e. "equal") is the OR of all the single "Equal's".

At step $Q_5$ the symbol retrieved from the memory ("MO") is loaded into the multicomparator (gates 2013 and 2013a); the answer ME or MD combined with PZ or PO as shown, conditions the passage to the next step ($Q_6$ or $Q_9$) (gates 2001, 2002, or gates 2004 and 2004a).

It is implied that the time necessary for the multicomparison is shorter than the interval $D_2$ to $D_1$.

FIG. 20a corresponds to the logic of FIG. 19a and FIG. 20b to the logic of FIG. 19b.

As previously discussed, many variations can be considered that go from the inclusion of additional functionalities to the selection of alternate equivalent logical sequences. For simplicity, these variations are not discussed, being understood that the principles of the present inventions can be applied or implemented in many similar modes without departing from the true spirit and scope of the invention.

I claim:

1. In a multiprogramming/multiprocessing computer system for executing a plurality of processes sharing common information in the form of records, pages, or messages, an apparatus for identifying those processes of said plurality of processes which would interfere with a first predetermined process executing on said computer system when said first predetermined process accesses the common information, said apparatus comprising:
   (a) first means for storing coded signals indicating the history of utilization of the common information by any one of said plurality of processes; and
   (b) second means coupled to be responsive to said first means for identifying those processes of said plurality of processes whose history of utilization of common information causes interference with said first predetermined process.

2. In a multiprogramming/multiprocessing computer system for executing a plurality of processes sharing common information, an apparatus for identifying first processes of said plurality of processes which would interfere with a second process of said processes which is executing on said computer system when said second process accesses the common information, said apparatus comprising:
   (a) first means for storing first coded signals indicative of the history of utilization of the common information by any one of said plurality of processes;
   (b) second means for identifying third processes which sequentially follow said second process for execution on said computer system;
   (c) third means, coupled to said second means, for storing second coded signals which identify said third processes; and
   (d) fourth means, coupled to said first and third means, for comparing said first coded signals with said second coded signals.

3. The apparatus as recited in claim 2 including fifth means coupled to said fourth means for indicating which of said third processes would interfere with said second process executing on said computer system.

4. The apparatus as recited in claim 3 including sixth means coupled to said fifth means for causing said second process to access a previous edition of the common information.

5. The apparatus as recited in claim 3 including seventh means coupled to said fifth means for causing those processes of said third processes that would interfere with said second process to abort.

6. The apparatus as recited in claim 3 including eighth means coupled to said fifth means for causing said second process to assume a wait-state.

7. The apparatus as recited in claim 6 including ninth means coupled to said eighth means for causing said second process to leave the wait-state.

8. In a multiprogramming/multiprocessing computer system for executing a plurality of processes sharing common information, a method for identifying first processes of said plurality of processes which would interfere with a second process of said processes which is executing on said computer system when said second process accesses the common information, said method comprising:
   (a) storing first coded signals indicative of the history of utilization of the common information by any one of said plurality of processes;
   (b) identifying third processes which sequentially follow said second process in executing on said computer system;
   (c) storing second coded signals which identify the third processes; and
   (d) comparing said first coded signals with said second coded signals.

9. The method as recited in claim 8 including the step of indicating which of said third processes would interfere with said second process executing on said computer system.

10. The method as recited in claim 9 including the step of causing said second process to access a previous edition of the common information.

11. The method as recited in claim 9 including the step for causing those processes of said third processes that would interfere with said second process to abort.

12. The method as recited in claim 9 including the step for causing said second process to assume the wait-state.

13. The method as recited in claim 12 including the step of causing said second process to leave the wait-state.

14. In a multiprogramming/multiprocessing computer system for executing a plurality of processes sharing common information, a method for identifying those processes of said plurality of processes which would interfere with a first predetermined process executing on said computer system when said first predetermined process accesses the common information, said method comprising:
   (a) storing coded signals indicating the history of utilization of the common information by any one of said plurality of processes; and
   (b) identifying those processes of said plurality of processes whose history of utilization of common information causes interference with said first predetermined process.

15. In a multiprocessing/multiprogramming computer system for executing a plurality of processes, an apparatus for permitting said plurality of processes to share common units of information so that any first of said plurality of processes does not interfere with any second of said plurality of processes, said apparatus comprising:
   (a) first means for storing first coded signals indicative of the history of utilization of the common units of inforamation by any one of said plurality of processes, said first means further storing second coded signals indicative of a sequential relationship among those processes;
   (b) second means, coupled to be responsive to said first means, for identifying third processes which sequentially follow said second process in a logical sequence of execution on said computer system;

(c) third means, coupled to said second means, for storing third coded signals identifying said third processes;
(d) fourth means, coupled to said first and third means, for comparing said first coded signals with third coded signals; and,
(e) fifth means, coupled to said fourth means, for indicating which of said third processes could interfere with said second process.

16. The apparatus as recited in claim 15 including sixth means, coupled to said fifth means, for indicating whether or not causing said second process to access a predetermined previous edition of the common unit of information is possible, and further including seventh means coupled to said sixth means for causing said second process to access said predetermined previous edition of the common unit of information when possible.

17. The apparatus as recited in claim 16 including eighth means, coupled to said fifth, sixth and seventh means, for identifying those processes of said third processes that are causing an interference.

* * * * *